US010915468B2

(12) United States Patent
Das Sharma et al.

(10) Patent No.: US 10,915,468 B2
(45) Date of Patent: Feb. 9, 2021

(54) SHARING MEMORY AND I/O SERVICES BETWEEN NODES

(71) Applicant: Intel Corporation, Santa Clara, CA (US)

(72) Inventors: Debendra Das Sharma, Saratoga, CA (US); Robert G. Blankenship, Tacoma, WA (US); Suresh S. Chittor, Portland, OR (US); Kenneth C. Creta, Gig Harbor, WA (US); Balint Fleischer, Groton, MA (US); Michelle C. Jen, Sunnyvale, CA (US); Mohan J. Kumar, Aloha, OR (US); Brian S. Morris, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/039,468

(22) PCT Filed: Dec. 26, 2013

(86) PCT No.: PCT/US2013/077785
§ 371 (c)(1),
(2) Date: May 26, 2016

(87) PCT Pub. No.: WO2015/099730
PCT Pub. Date: Jul. 2, 2015

(65) Prior Publication Data
US 2017/0004098 A1 Jan. 5, 2017

(51) Int. Cl.
G06F 12/00 (2006.01)
G06F 13/16 (2006.01)
(Continued)

(52) U.S. Cl.
CPC ...... *G06F 13/1663* (2013.01); *G06F 12/1475* (2013.01); *G06F 13/385* (2013.01);
(Continued)

(58) Field of Classification Search
CPC ............... G06F 13/1663; G06F 13/385; G06F 13/4282; G06F 12/1475; G06F 10/14;
(Continued)

(56) References Cited

U.S. PATENT DOCUMENTS 6,226,771 B1 * 5/2001 Hilla ................ H03M 13/09
714/758
6,370,585 B1 * 4/2002 Hagersten ........... G06F 11/0712
709/213

(Continued)

FOREIGN PATENT DOCUMENTS

| CN | 101523361 A | 9/2009 |
| JP | 04084258 | 3/1992 |

(Continued)

OTHER PUBLICATIONS

International Preliminary Report on Patentability for International Application No. PCT/US2013/077785 dated Jun. 28, 2016.
(Continued)

*Primary Examiner* — Kalpit Parikh
(74) *Attorney, Agent, or Firm* — Alliance IP, LLC

(57) ABSTRACT

A shared memory controller is to service load and store operations received, over data links, from a plurality of independent nodes to provide access to a shared memory resource. Each of the plurality of independent nodes is to be permitted to access a respective portion of the shared memory resource. Interconnect protocol data and memory access protocol data are sent on the data links and transitions between the interconnect protocol data and memory access protocol data can be defined and identified.

25 Claims, 17 Drawing Sheets

(51) Int. Cl.
*G06F 13/38* (2006.01)
*G06F 12/14* (2006.01)
*G06F 13/42* (2006.01)

(52) U.S. Cl.
CPC .. *G06F 13/4282* (2013.01); *G06F 2212/1052* (2013.01); *G06F 2213/0026* (2013.01); *Y02D 10/00* (2018.01)

(58) Field of Classification Search
CPC ......... G06F 10/151; G06F 2212/1052; G06F 2213/0026
See application file for complete search history.

(56) References Cited

U.S. PATENT DOCUMENTS

| | | |
|---|---|---|
| 2002/0087807 A1 | 7/2002 | Gharachorloo et al. |
| 2004/0030668 A1* | 2/2004 | Pawlowski ........... G06F 3/0607 |
| 2004/0034747 A1 | 2/2004 | Rowlands et al. |
| 2004/0054855 A1 | 3/2004 | Yasuda et al. |
| 2006/0190552 A1 | 8/2006 | Henze et al. |
| 2007/0022138 A1* | 1/2007 | Erasani ............... G06F 11/0709 |
| 2007/0067481 A1* | 3/2007 | Sharma .................. H04L 69/12 709/231 |
| 2007/0220059 A1* | 9/2007 | Lu ..................... G06F 17/30368 |
| 2008/0301379 A1 | 12/2008 | Pong |
| 2010/0017572 A1 | 1/2010 | Koka et al. |
| 2012/0079156 A1 | 3/2012 | Safranek et al. |
| 2012/0229310 A1 | 9/2012 | Chang |
| 2012/0317328 A1 | 12/2012 | Rankin et al. |
| 2013/0179902 A1 | 7/2013 | Hoover et al. |
| 2013/0268711 A1* | 10/2013 | Safranek ................. G06F 13/16 710/308 |
| 2014/0372658 A1* | 12/2014 | Safranek ................. G06F 13/14 710/314 |
| 2015/0032932 A1* | 1/2015 | Chang .................... G06F 13/00 710/308 |
| 2015/0186057 A1* | 7/2015 | Das Sharma ......... G06F 3/0619 714/6.3 |

FOREIGN PATENT DOCUMENTS

| | | |
|---|---|---|
| JP | 2008020977 A | 1/2008 |
| JP | 2008046969 A | 2/2008 |
| JP | 2010078941 A | 4/2010 |
| WO | 2015099730 A1 | 7/2015 |

OTHER PUBLICATIONS

PCT International Search Report and Written Opinion in International Application No. PCT/US2013/077785 dated Sep. 24, 2014.
Extended European Search Report for Application No. 13900545.8, dated Aug. 3, 2017, 7 pages.
State Intellectual Property Office; Third Office Action issued for CN Patent Application No. 201380081419.8, dated Mar. 14, 2019; 3 pages, no English translation available.
Office Action for Application No. EP20130900154, dated Nov. 29, 2018, 5 pages.
Minutes of the oral proceedings before the Examining Division in EP Application Serial No. 13 900 154.9 mailed on Feb. 10, 2020 (12 pages).
Non Final Notice of Reasons for Refusal issued in Japanese Patent Application No. 2016-529464 dated May 23, 2017 (8 pages); English translation provided (10 pages).
KIPO, Office Action in Korean Patent Application No. 2016-7013908 dated Sep. 14, 2017 (6 pages) with English translation (7 pages).
Brazil Patent Office; Office Action issued in BR Patent Application No. BR112016011691-7, dated Jan. 28, 2020; 5 pages including English translation.

* cited by examiner

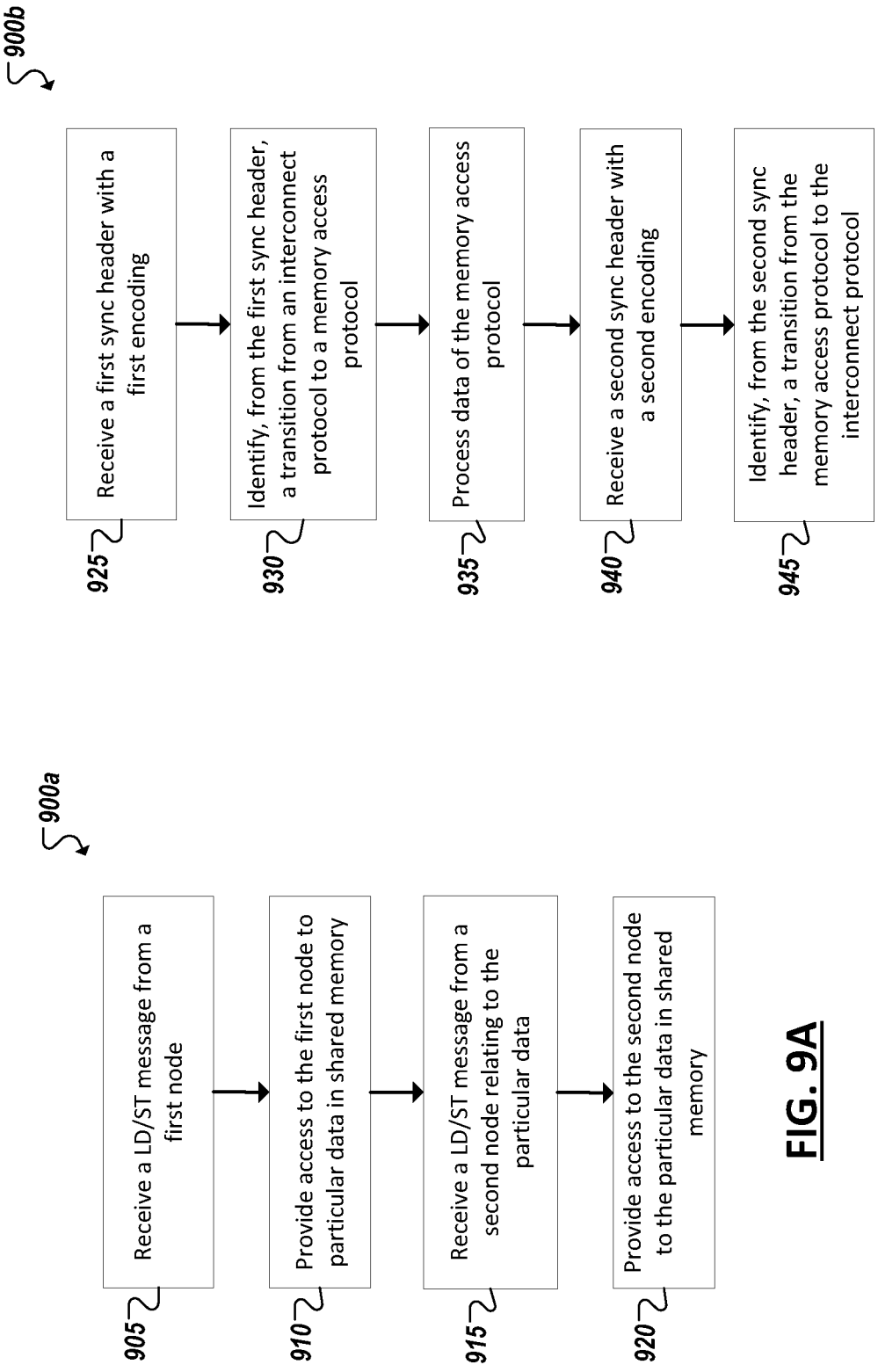

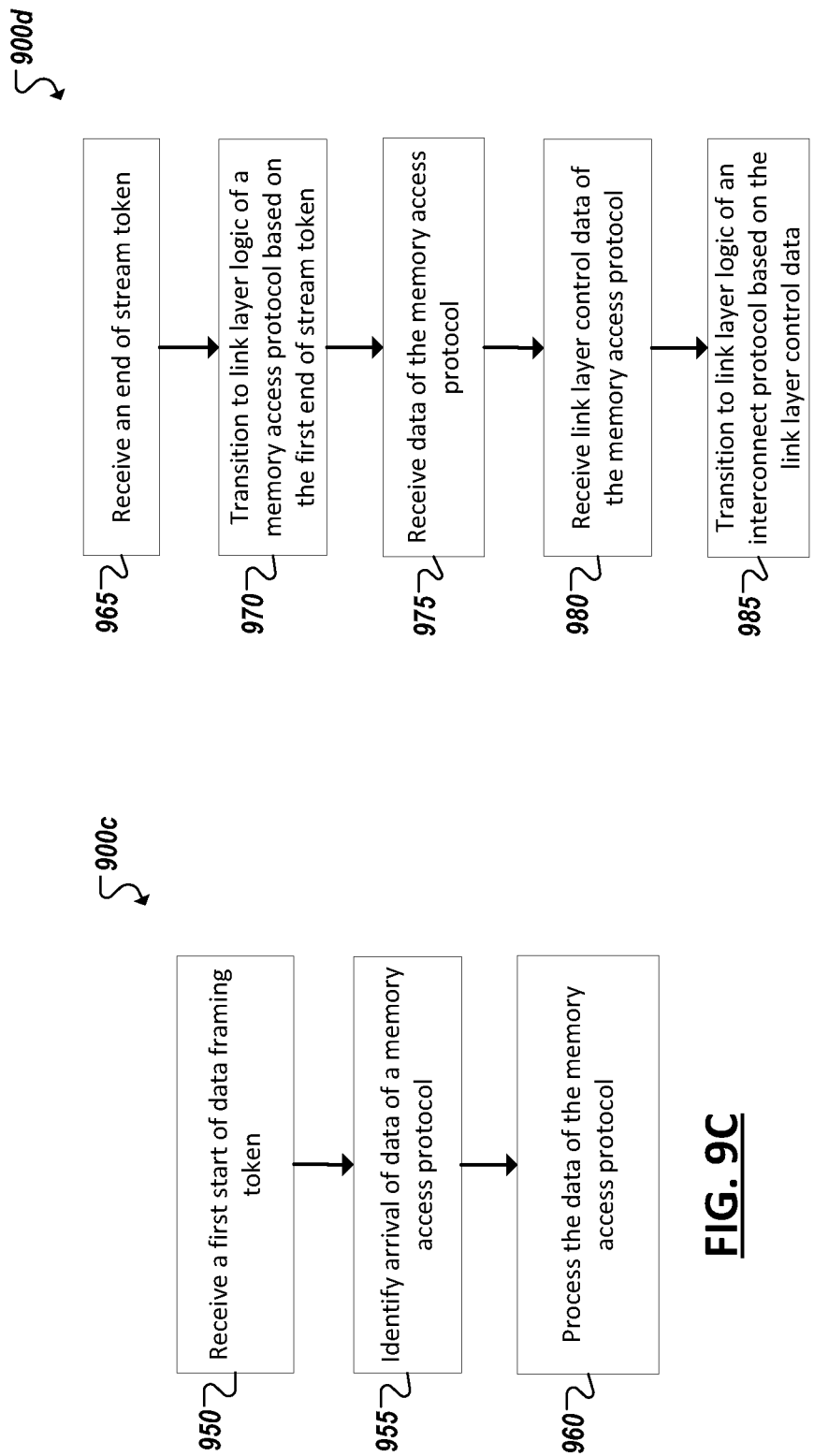

SHARING MEMORY AND I/O SERVICES BETWEEN NODES

CROSS-REFERENCE TO RELATED APPLICATIONS

This Application is a national stage application under 35 U.S.C. § 371 of PCT Application PCT/US2013/077785, filed on Dec. 26, 2013 and entitled "Sharing Memory and I/O Services Between Nodes", which is incorporated by reference in its entirety. The disclosures of the prior application is considered part of and is hereby incorporated by reference in its entirety in the disclosure of this application.

FIELD

This disclosure pertains to computing system, and in particular (but not exclusively) to memory access between components in a computing system.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 9A-9D are flowcharts illustrating example techniques for memory access messaging.

Like reference numbers and designations in the various drawings indicate like elements.

DETAILED DESCRIPTION

Figure 1:
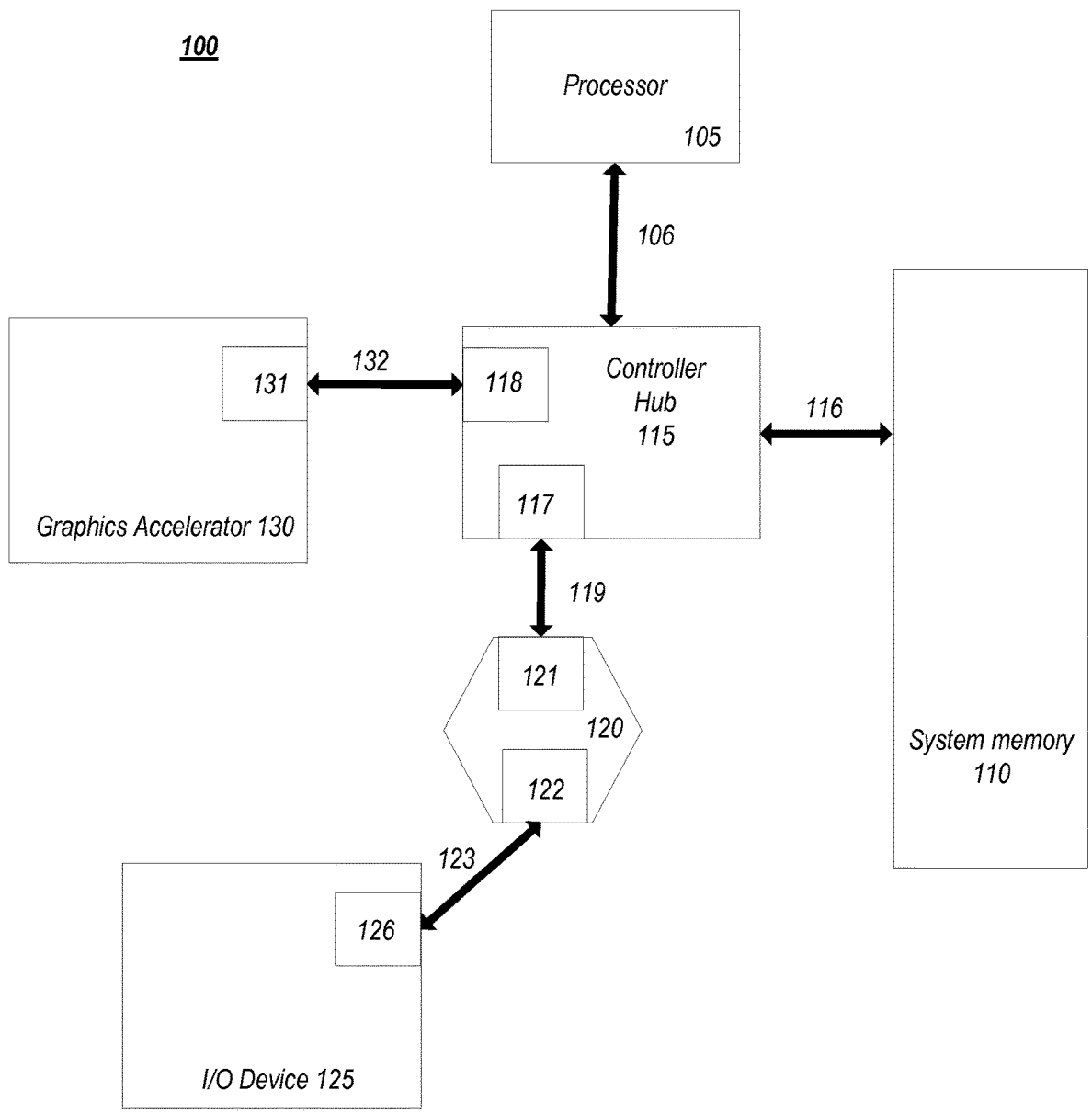
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
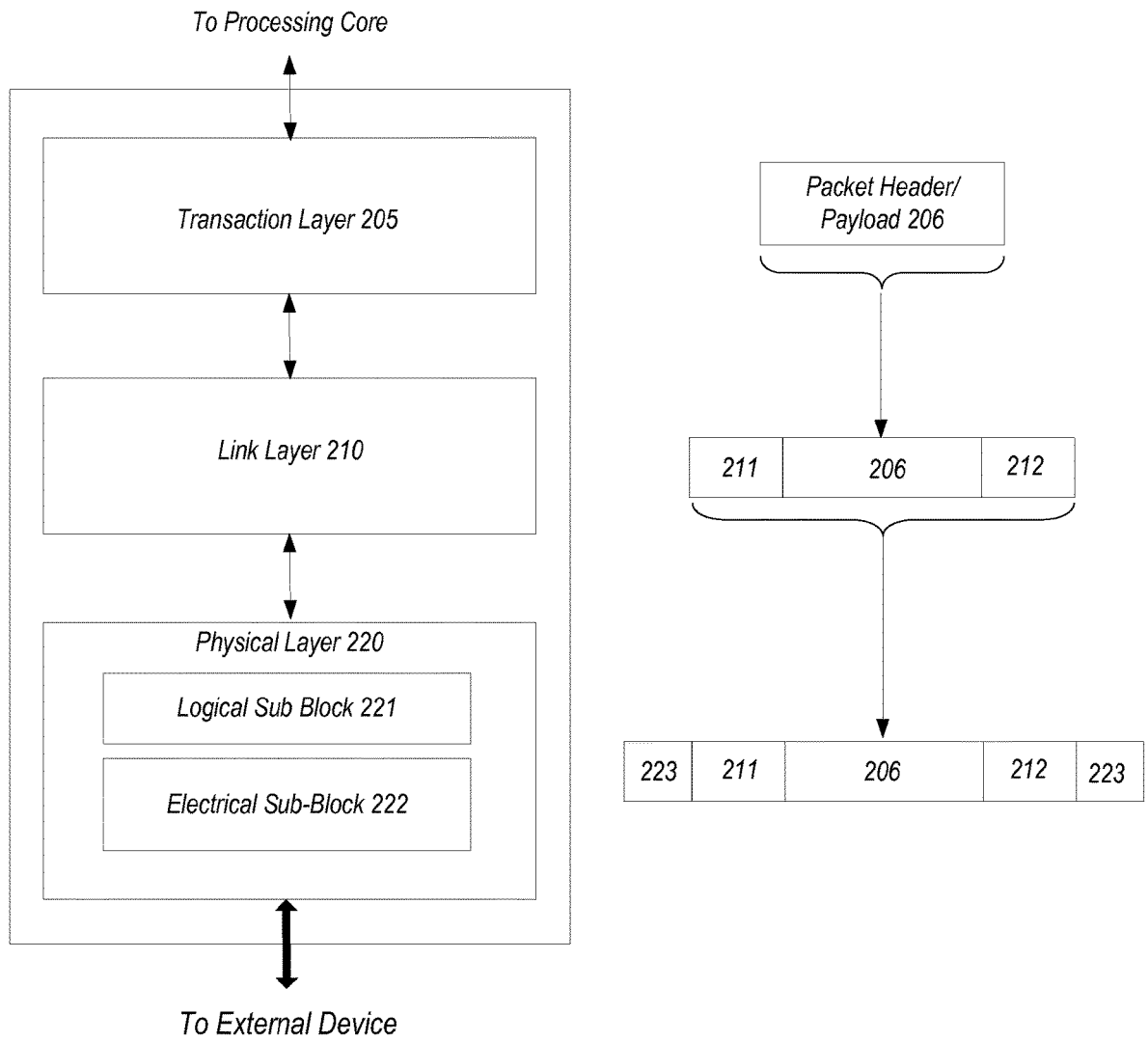
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
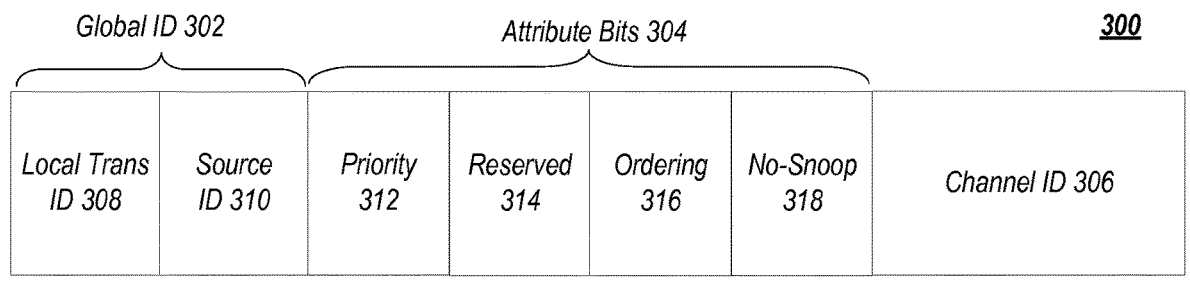
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is deserialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
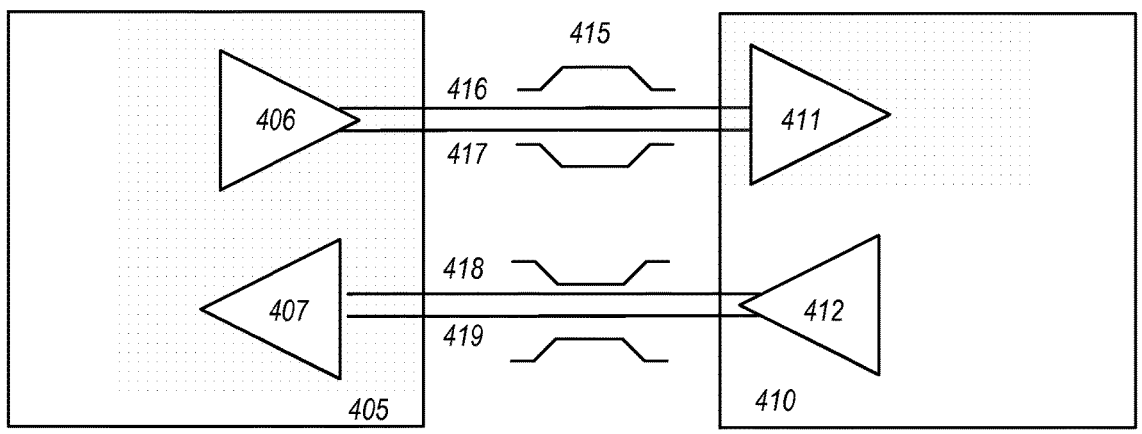
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Physical layers of existing interconnect and communication architectures, including PCIe, can be leveraged to provide shared memory and I/O services within a system. Traditionally, cacheable memory cannot be shared between independent systems using traditional load/store (LD/ST) memory semantics. An independent system, or "node", can be independent in the sense that it functions as a single logical entity, is controlled by a single operating system (and/or single BIOS or Virtual Machine Monitor (VMM)), and/or has an independent fault domain. A single node can include one or multiple processor devices, be implemented on a single board or multiple boards, and include local memory, including cacheable memory that can be accessed using LD/ST semantics by the devices on the same node. Within a node, shared memory can include one or more blocks of memory, such as a random access memory (RAM), that can be accessed by several different processors (e.g., central processing units (CPUs)) within a node. Shared memory can also include the local memory of the processors or other devices in the node. The multiple devices within a node having shared memory can share a single view of data within the shared memory. I/O communication involving shared memory can be very low latency and allow quick access to the memory by the multiple processors.

Traditionally, memory sharing between different nodes has not allowed memory sharing according to a load/store paradigm. For instance, in some systems, memory sharing between different nodes has been facilitated through distributed memory architectures. In traditional solutions, computational tasks operate on local data, and if data of another node is desired, the computational task (e.g., executed by another CPU node) communicates with the other node, for instance, over a communication channel utilizing a communication protocol stack, such as Ethernet, InfiniBand, or another layered protocol. In traditional multi-node systems, the processors of different nodes do not have to be aware where data resides. Sharing data using traditional approaches, such as over a protocol stack, can have a significantly higher latency than memory sharing within a node using a load/store paradigm. Rather than directly addressing and operating on data in shared memory, one node can request data from another using an existing protocol handshake such as Ethernet (or Infiniband), and the source node can provide the data, such that the data can be stored and operated on by the requesting node, among other examples.

In some implementations, a shared memory architecture can be provided that allows memory to be shared between independent nodes for exclusive or shared access using load/store (LD/ST) memory semantics. In one example, memory semantics (and directory information, if applicable) along with I/O semantics (for protocols such as PCIe) can be exported on either a common set of pins or a separate set of pins. In such a system, the improved shared memory architecture can each of a plurality of nodes in a system to maintain its own independent fault domain (and local memory), while enabling a shared memory pool for access by the nodes and low-latency message passing between nodes using memory according to LD/ST semantics. In some implementations, such a shared memory pool can be dynamically (or statically) allocated between different nodes. Accordingly, one can also configure the various nodes of a system into dynamically changing groups of nodes to work cooperatively and flexibly on various tasks making use of the shared memory infrastructure, for instance, as demand arises.

Figure 5A:
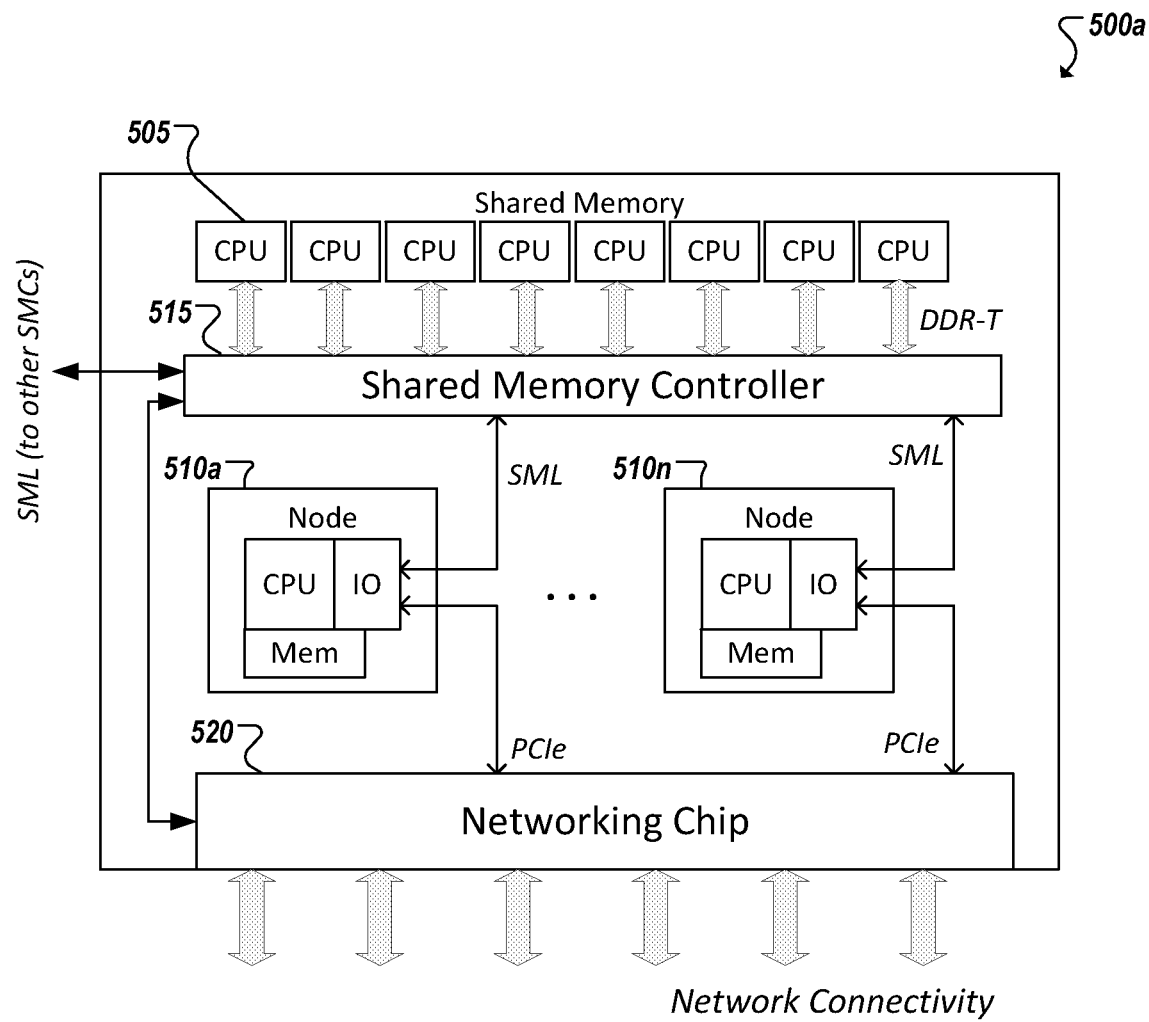
FIG. 5A illustrates a simplified block diagram of an embodiment of an example node.

Turning to FIG. 5A, a simplified block diagram 500a is shown illustrating an example system including shared memory 505 capable of being accessed using load/store techniques by each of a plurality of independent nodes 510a-510n. For instance, a shared memory controller 515 can be provided that can accept load/store access requests of the various nodes 510a-510n on the system. Shared memory 505 can be implemented utilizing synchronous dynamic random access memory (SDRAM), dual in-line memory modules (DIMM), and other non-volatile memory (or volatile memory).

Each node may itself have one or multiple CPU sockets and may also include local memory that remains insulated from LD/ST access by other nodes in the system. The node can communicate with other devices on the system (e.g., shared memory controller 515, networking controller 520, other nodes, etc.) using one or more protocols, including PCIe, QPI, Ethernet, among other examples. In some implementations, a shared memory link (SML) protocol can be provided through which low latency LD/ST memory semantics can be supported. SML can be used, for instance, in communicating reads and writes of shared memory 505 (through shared memory controller 515) by the various nodes 510a-510n of a system.

In one example, SML can be based on a memory access protocol, such as Scalable Memory Interconnect (SMI) 3rd generation (SMI3). Other memory access protocols can be alternatively used, such as transactional memory access protocols such as fully buffered DIMM (FB-DIMM), DDR Transactional (DDR-T), among other examples. In other instances, SML can be based on native PCIe memory read/write semantics with additional directory extensions. A memory-protocol-based implementation of SML can offer bandwidth efficiency advantages due to being tailored to cache line memory accesses. While high performance inter-device communication protocols exist, such as PCIe, upper layers (e.g., transaction and link layers) of such protocols can introduce latency that degrades application of the full protocol for use in LD/ST memory transactions, including transactions involving a shared memory 505. A memory protocol, such as SMI3, can allow a potential additional advantage of offering lower latency accesses since it can bypass most of another protocol stack, such as PCIe. Accordingly, implementations of SML can utilize SMI3 or another memory protocol running on a logical and physical PHY of another protocol, such as SMI3 on PCIe.

As noted, in some implementation, a shared memory controller (SMC) 515 can be provided that includes logic for handling load/store requests of nodes 510a-510n in the system. Load/store requests can be received by the SMC 515 over links utilizing SML and connecting the nodes 510a-510n to the SMC 515. In some implementations the SMC 515 can be implemented as a device, such as an application-specific integrated circuit (ASIC), including logic for servicing the access requests of the nodes 510a-510n for shared memory resources. In other instances, the SMC 515 (as well as shared memory 505) can reside on a device, chip, or board separate from one or more (or even all) of the nodes 510a-510n. The SMC 515 can further include logic to coordinate various nodes' transactions that involve shared memory 505. Additionally, the SMC can maintain a directory tracking access to various data resources, such as each cache line, included in shared memory 505. For instance, a data resource can be in a shared access state (e.g., capable of being accessed (e.g., loaded or read) by multiple processing and/or I/O devices within a node, simultaneously), an exclusive access state (e.g., reserved exclusively, if not temporarily, by a single processing and/or I/O device within a node (e.g., for a store or write operation), an uncached state, among other potential examples. Further, while each node may have direct access to one or more portions of shared memory 505, different addressing schemes and values may be employed by the various nodes (e.g., 510a-510n) resulting in the same shared memory data being referred to (e.g., in an instruction) by a first node according to a first address value and a second node being referring to the same data by a second address value. The SMC 515 can include logic, including data structures mapping nodes' addresses to shared memory resources, to allow the SMC 515 to interpret the various access requests of the various nodes.

Additionally, in some cases, some portion of shared memory (e.g., certain partitions, memory blocks, records, files, etc.) may be subject to certain permissions, rules, and assignments such that only a portion of the nodes 510a-510n are allowed (e.g., by the SMC 515) to access the corresponding data. Indeed, each shared memory resource may be assigned to a respective (and in some cases different) subset of the nodes 510a-510n of the system. These assignments can be dynamic and SMC 515 can modify such rules and permissions (e.g., on-demand, dynamically, etc.) to accommodate new or changed rules, permissions, node assignments and ownership applicable to a given portion of the shared memory 505.

An example SMC 515 can further track various transactions involving nodes (e.g., 510a-510n) in the system accessing one or more shared memory resources. For instance, SMC 515 can track information for each shared memory 505 transaction, including identification of the node(s) involved in the transaction, progress of the transaction (e.g., whether it has been completed), among other transaction information. This can permit some of the transaction-oriented aspects of traditional distributed memory architectures to be applied to the improved multi-node shared memory architecture described herein. Additionally, transaction tracking (e.g., by the SMC) can be used to assist in maintaining or enforcing the distinct and independent fault domains of each respective node. For instance, the SMC can maintain the corresponding Node ID for each transaction-in-progress in its internal data structures, including in memory, and use that information to enforce access rights and maintain individual fault-domains for each node. Accordingly, when one of the nodes goes down (e.g., due to a critical error, triggered recovery sequence, or other fault or event), only that node and its transactions involving the shared memory 505 are interrupted (e.g., dumped by the SMC)—transactions of the remaining nodes that involve the shared memory 505 continue on independent of the fault in the other node.

A system can include multiple nodes. Additionally, some example systems can include multiple SMCs. In some cases, a node may be able to access shared memory off a remote SMC to which it is not directly attached to (i.e., the node's local SMC connects to the remote SMC through one or multiple SML Link hops). The remote SMC may be in the same board or could be in a different board. In some cases, some of the nodes may be off-system (e.g., off board or off chip) but nonetheless access shared memory 505. For instance, one or more off-system nodes can connect directly to the SMC using an SML-compliant link, among other examples. Additionally, other systems that include their own SMC and shared memory can also connect with the SMC 510 to extend sharing of memory 505 to nodes included, for instance, on another board that interface with the other SMC connected to the SMC over an SML link. Still further, network connections can be tunneled through to further extend access to other off-board or off-chip nodes. For instance, SML can tunnel over an Ethernet connection (e.g., provided through network controller 520) communicatively coupling the example system of FIG. 5A with another system that can also include one or more other nodes and allow these nodes to also gain access to SMC 515 and thereby shared memory 505, among other examples.

Figure 5B:
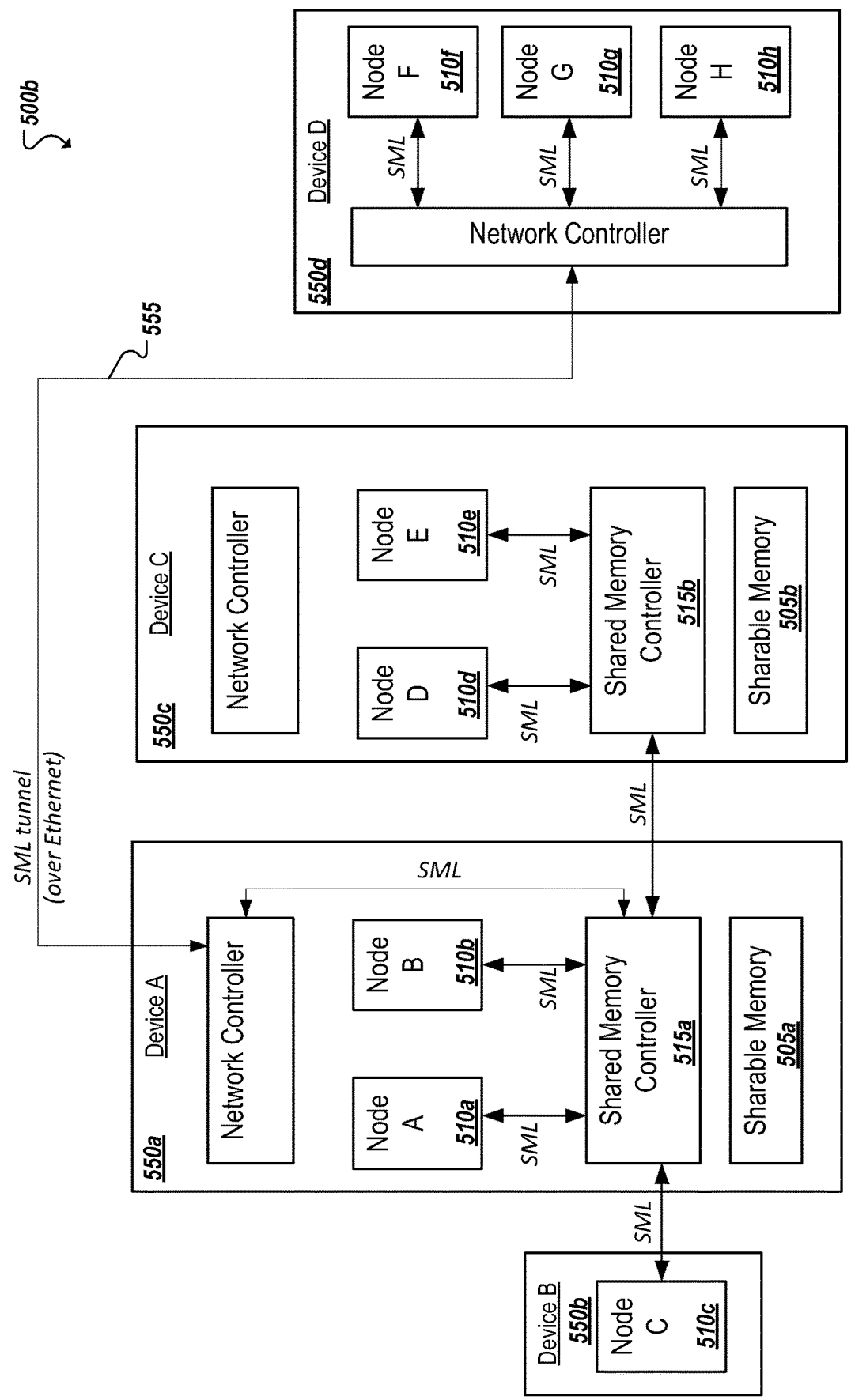
FIG. 5B illustrates a simplified block diagram of an embodiment of an example system including a plurality of nodes.

As another example, as shown in the simplified block diagram 500b of FIG. 5B, an improved shared memory architecture permitting shared access by multiple independent nodes according to a LD/ST memory semantic can flexibly allow for the provision of a variety of different multi-node system designs. Various combinations of the multiple nodes can be assigned to share portions of one or more shared memory blocks provided in an example system. For instance, another example system shown in the example of FIG. 5B, can include multiple devices 550a-550d implemented, for instance, as separate dies, boards, chips, etc., each device including one or more independent CPU nodes (e.g., 510a-510h). Each node can include its own local memory. One or more of the multiple devices 550a-550d can further include shared memory that can be accessed by two or more of the nodes 510a-510h of the system.

The system illustrated in FIG. 5B is an example provided to illustrate some of the variability that can be realized through an improved shared memory architecture, such as shown and described herein. For instance, each of a Device A 550a and Device C 550c can include a respective shared memory element (e.g., 505a, 505b). Accordingly, in some implementations, each shared memory element on a distinct device may further include a respective shared memory controller (SMC) 515a, 515b. Various combinations of nodes 510a-510h can be communicatively coupled to each SMC (e.g., 515a, 515b) allowing the nodes to access the corresponding shared memory (e.g., 505a, 505b). As an example, SMC 515a of Device A 550a can connect to nodes 510a, 510b on Device A using a direct data link supporting SML. Additionally, another node 510c on another device (e.g., Device C 550c) can also have access to the shared memory 505a by virtue of a direct, hardwired connection (supporting SML) from the node 510c (and/or its device 550c) to SMC 515a. Indirect, network-based, or other such connections can also be used to allow nodes (e.g., 510f-510h) of a remote or off-board device (e.g., Device D 550d) to utilize a conventional protocol stack to interface with SMC 515a to also have access to shared memory 505a. For instance, an SML tunnel 555 can be established over an Ethernet, InfiniBand, or other connection coupling Device A and Device D. While establishing and maintaining the tunnel can introduce some additional overhead and latency, compared to SML running on other less-software-managed physical connections, the SML tunnel 555 when established can operate as other SML channels and allow the nodes 510f-510h to interface with SMC 515a over SML and access shared memory 505a as any other node communicating with SMC over an SML link can. For instance, reliability and ordering of the packets in the SML channels can be enforced either by the networking components in the system or it can be enforced end-to-end between the SMCs.

In still other examples, nodes (e.g., 515d, 515e) on a device different from that hosting a particular portion of shared memory (e.g., 505a) can connect indirectly to the corresponding SMC (e.g., SMC 515a) by connecting directly to another SMC (e.g., 515b) that is itself coupled (e.g., using an SML link) to the corresponding SMC (e.g., 515a) Linking two or more SMCs (e.g., 515a, 515b) can effectively expand the amount of shared memory available to the nodes 510a-510h on the system. For instance, by virtue of a link between SMCs 515a, 515b in the example of FIG. 5B, in some implementations, any of the nodes (e.g., 510a-510c, 510f-510h) capable of accessing shared memory 505a through SMC 515a may also potentially access sharable memory 505b by virtue of the connection between SMC 515a and SMC 515b. Likewise, in some implementations, each of the nodes directly accessing SMC 515b can also access sharable memory 505a by virtue of the connection between the SMCs 515a, 515b, among other potential examples.

As noted above, an improved shared memory architecture can include a low-latency link protocol (i.e., SML) based on a memory access protocol, such as SMI3, and provided to facilitate load/store requests involving the shared memory. Whereas traditional SMI3 and other memory access protocols may be configured for use in memory sharing within a single node, SML can extend memory access semantics to multiple nodes to allow memory sharing between the multiple nodes. Further, SML can potentially be utilized on any physical communication link. SML can utilize a memory access protocol supporting LD/ST memory semantics that is overlaid on a physical layer (and corresponding physical layer logic) adapted to interconnect distinct devices (and nodes). Additionally, physical layer logic of SML can provide for no packet dropping and error retry functionality, among other features.

In some implementations, SML can be can be implemented by overlaying SMI3 on a PCIe PHY. An SML link layer can be provided (e.g., in lieu of a traditional PCIe link layer) to forego flow control and other features and facilitate lower latency memory access such as would be characteristic in traditional CPU memory access architectures. In one example, SML link layer logic can multiplex between shared memory transactions and other transactions. For instance, SML link layer logic can multiplex between SMI3 and PCIe transactions. For instance, SMI3 (or another memory protocol) can overlay on top of PCIe (or another interconnect protocol) so that the link can dynamically switch between SMI3 and PCIe transactions. This can allow traditional PCIe traffic to effectively coexist on the same link as SML traffic in some instances.

Figure 6:
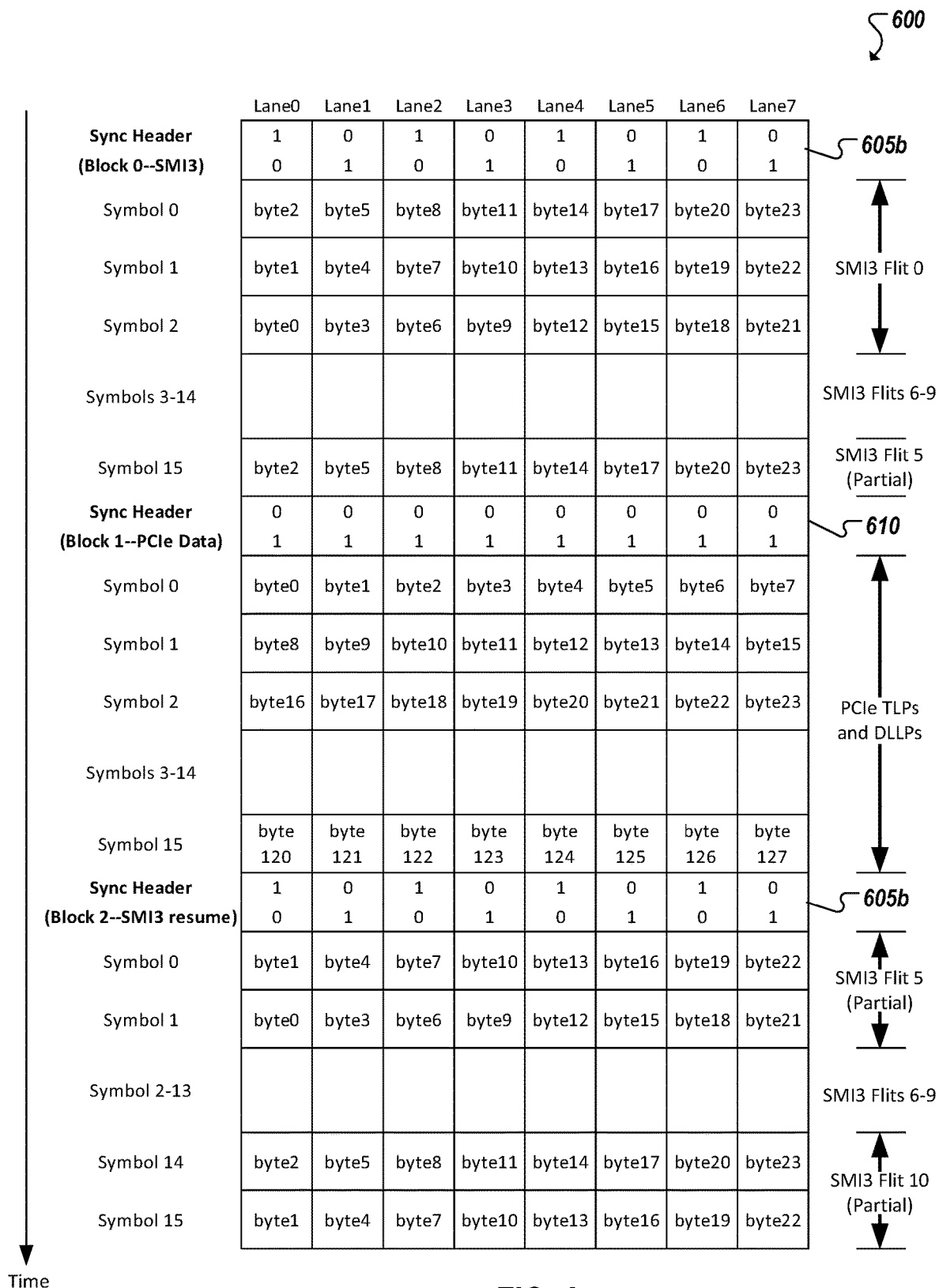
FIG. 6 is a representation of data transmitted according to an example shared memory link.

Turning to FIG. 6, a representation 600 is shown illustrating a first implementation of SML. For instance, SML can be implemented by overlaying SMI3 on a PCIe PHY. The physical layer can use standard PCIe 128b/130b encoding for all physical layer activities including link training as well as PCIe data blocks. SML can provide for traffic on the lanes (e.g., Lane0-Lane7) of the link to be multiplexed between PCIe packets and SMI3 flits. For example, in the implementation illustrated in FIG. 6, the sync header of the PCIe 128b/130b encoding can be modified and used to indicate that SMI3 flits are to be sent on the lanes of the link rather than PCIe packets. In traditional PCIe 128b/130b encoding, valid sync headers (e.g., 610) can include the sending of either a 10b pattern on all lanes of the link (to indicate that the type of payload of the block is to be PCIe Data Block) or a 01b pattern on all lanes of the link (to indicate that the type of payload of the block is to be PCIe Ordered Set Block). In an example of SML, an alternate sync header can be defined to differentiate SMI3 flit traffic from PCIe data blocks and ordered sets. In one example, illustrated in FIG. 6, the PCIe 128b/130b sync header (e.g., 605a, 605b) can be encoded with alternating 01b, 10b patterns on odd/even lanes to identify that SMI3 flits are to be sent. In another alternative implementation, the 128b/130b sync header encoding for SMI3 traffic can be defined by alternating 10b, 01b patterns on odd/even lanes, among other example encodings. In some cases, SMI3 flits can be transmitted immediately following the SMI3 sync header on a per-byte basis, with the transition between PCIe and SMI3 protocols taking place at the block boundary.

In some implementations, such as that illustrated in the example of FIG. 6, the transition between the protocols can be defined to take place at the block boundary irrespective of whether it corresponds to an SMI3 flit or PCIe packet boundary. For instance, a block can be defined to include a predefined amount of data (e.g., 16 symbols, 128 bytes, etc.). In such implementations, when the block boundary does not correspond to an SMI3 flit or PCIe packet boundary, the transmission of an entire SMI3 flit may be interrupted. An interrupted SMI3 flit can be resumed in the next SMI3 block indicated by the sending of another sync header encoded for SMI3.

Figure 7A:
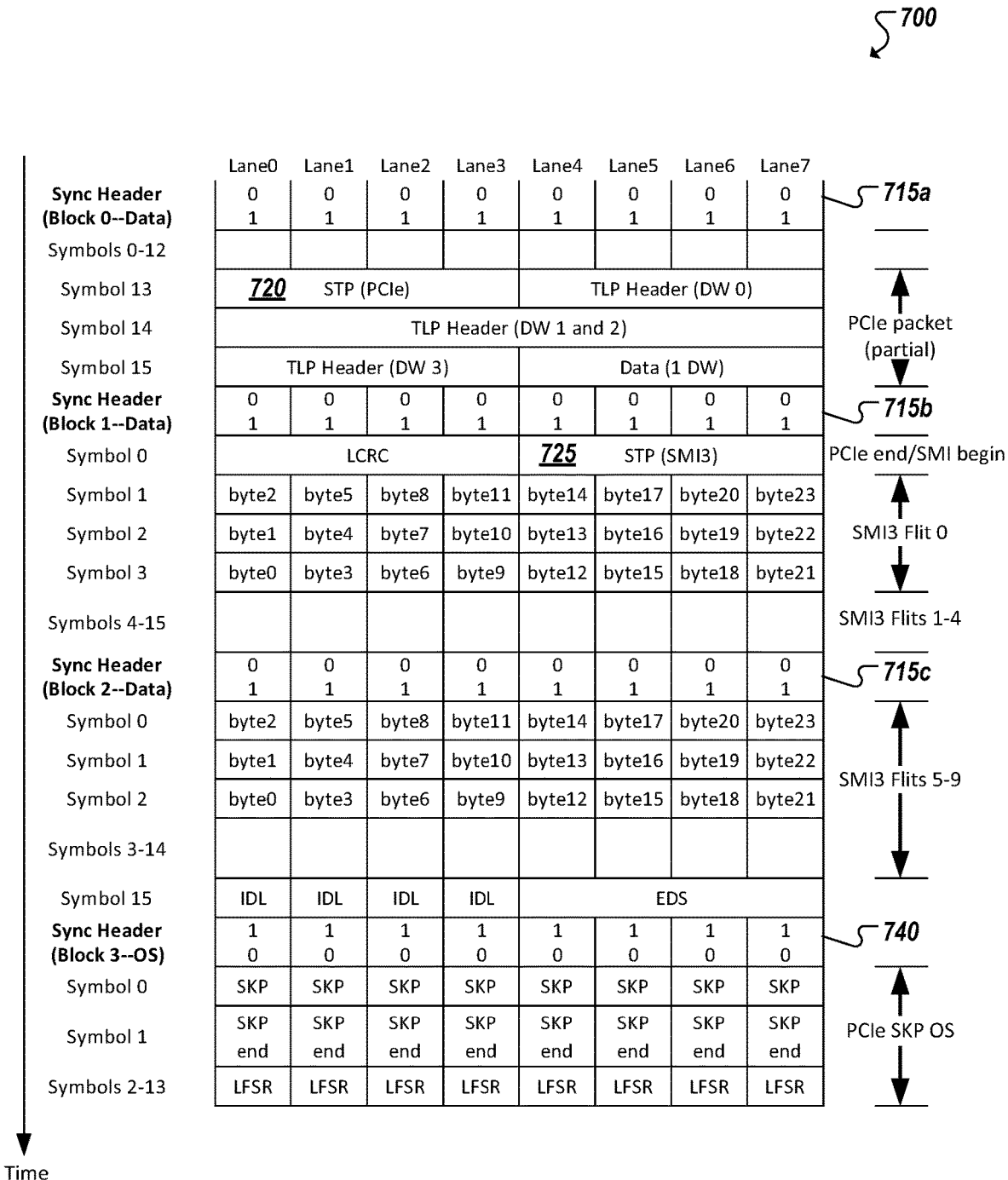
FIG. 7A is a representation of data transmitted according to another example of a shared memory link.

Turning to FIG. 7A, a representation 700 is shown illustrating another example implementation of SML. In the example of FIG. 7A, rather than using a specialized sync header encoding to signal transitions between memory access and interconnect protocol traffic, physical layer framing tokens can be used. A framing token (or "token") can be a physical layer data encapsulation that specifies or implies the number of symbols to be included in a stream of data associated with the token. Consequently, the framing token can identify that a stream is beginning as well as imply where it will end and can therefore be used to also identify the location of the next framing token. A framing token of a data stream can be located in the first symbol (Symbol 0) of the first lane (e.g., Lane 0) of the first data block of the data stream. In the example of PCIe, five framing tokens can be defined, including start of TLP traffic (STP) token, end of data stream (EDS) token, end bad (EDB) token, start of DLLP (SDP) token, and logical idle (IDL) token.

Figure 7B:
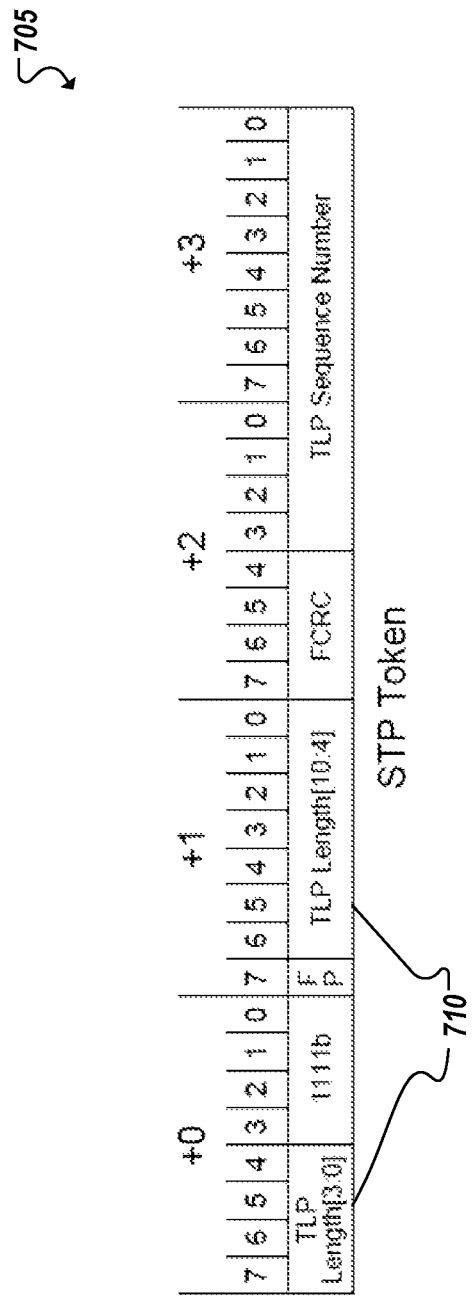
FIG. 7B is a representation of an example start of data framing token.

In the example of FIG. 7A, SML can be implemented by overlaying SMI3 or another data access protocol on PCIe and the standard PCIe STP token can be modified to define a new STP token that identifies that SMI3 (instead of TLP traffic) is to commence on the lanes of the link. In some examples, values of reserve bits of the standard PCIe STP token can be modified to define the SMI3 STP token in SML. Further, as shown in FIG. 7B, an STP token 705 can include several fields, including a 710 field that identifies the length of the SMI3 payload (in terms of the number of flits) that is to follow. In some implementations, one or more standard payload lengths can be defined for TLP data. SMI3 data can, in some implementations, be defined to include a fixed number of flits, or in other cases, may have variable numbers of flits in which case the length field for the number of SMI3 flits becomes a field that can be disregarded. Further, the length field for an SMI3 STP can be defined as a length other than one of the defined TLP payload lengths. Accordingly, an SMI3 STP can be identified based on a non-TLP length value being present in the STP length field, as one example. For example, in one implementation, the upper 3-bits of the 11-bit STP length field can be set to 111b to indicate the SMI3 packet (e.g., based on the assumption that no specification-compliant PCIe TLP can be long enough to have a length where the upper 3 bits of the length field would result in 1's). Other implementations can alter or encode other fields of the STP token to differentiate a PCIe STP token identifying a traditional PCIe TLP data payload from a SMI3 STP token identifying that SMI3 data is encapsulated in TLP data.

Returning to the example of FIG. 7A, sync header data can follow the encoding specified for traditional PCIe 128b/130b encoding. For instance, at 715a-c, sync headers with value 10b are received indicating that data blocks are forthcoming. When a PCIe STP (e.g., 720) is received, a PCIe TLP payload is expected and the data stream is processed accordingly. Consistent with the payload length identified in the PCIe STP 720, the PCIe TLP payload can utilize the full payload length allocated. Another STP token can be received essentially at any time within a data block following the end of the TLP payload. For instance, at 725, an SMI3 STP can be received signaling a transition from PCIe TLP data to SMI3 flit data. The SMI3 STP can be sent, for instance, as soon as an end of the PCIe packet data is identified.

Continuing with the example of FIG. 7A, as with PCIe TLP data, the SMI3 STP 725 can define a length of the SMI3 flit payload that is to follow. For instance, the payload length of the SMI3 data can correspond to the number of SMI3 flits in terms of DWs to follow. A window (e.g., ending at Symbol 15 of Lane 3) corresponding to the payload length can thereby be defined on the lanes, in which only SMI3 data is to be sent during the window. When the window concludes, other data can be sent, such as another PCIe STP to recommence sending of TLP data or other data, such as ordered set data. For instance, as shown in the example of FIG. 7A, an EDS token is sent following the end of the SMI3 data window defined by SMI3 STP token 725. The EDS token can signal the end of the data stream and imply that an ordered set block is to follow, as is the case in the example of FIG. 7A. A sync header 740 is sent that is encoded 01b to indicate that an ordered set block is to be sent. In this case a PCIe SKP ordered set is sent. Such ordered sets can be sent periodically or according to set intervals or windows such that various PHY-level tasks and coordination can be performed, including initializing bit alignment, initializing symbol alignment, exchanging PHY parameters, compensating for different bit rates for two communicating ports, among other examples. In some cases, a mandated ordered set can be sent to interrupt a defined window or data block specified for SMI3 flit data by a corresponding SMI3 STP token.

While not shown explicitly in the example of FIG. 7A, an STP token can also be used to transition from SMI3 flit data on the link to PCIe TLP data. For instance, following the end of a defined SMI3 window, a PCIe STP token (e.g., similar to token 720) can be sent to indicate that the next window is for the sending of a specified amount of PCIe TLP data.

Memory access flits (e.g., SMI3 flits) may vary in size in some embodiments, making it difficult to predict, a priori, how much data to reserve in the corresponding STP token (e.g., SMI3 STP token) for the memory access payload. As an example, as shown in FIG. 7, SMI3 STP 725 can have a length field indicating that 244 bytes of SMI3 data is to be expected following the SMI3 STP 725. However, in this example, only ten flits (e.g., SMI3 Flits 0-9) are ready to be sent during the window and these ten SMI3 flits only utilize 240 of the 244 bytes. Accordingly, four (4) bytes of empty bandwidth is left, and these are filled with IDL tokens. This can be particularly suboptimal when PCIe TLP data is queued and waiting for the SMI3 window to close. In other cases, the window provided for the sending of SMI3 flits may be insufficient to send the amount of SMI3 data ready for the lane. Arbitration techniques can be employed to determine how to arbitrate between SMI3 and PCIe TLP data coexisting on the link. Further, in some implementations, the length of the SMI3 windows can be dynamically modified to assist in more efficient use of the link. For instance, arbitration or other logic can monitor how well the defined SMI3 windows are utilized to determine whether the defined window length can be better optimized to the amount of SMI3 (and competing PCIe TLP traffic) expected for the lane. Accordingly, in such implementations, the length field values of SMI3 STP tokens can be dynamically adjusted (e.g., between different values) depending on the amount of link bandwidth that SMI3 flit data should be allocated (e.g., relative to other PCIe data, including TLP, DLLP, and ordered set data), among other examples.

Figure 8:
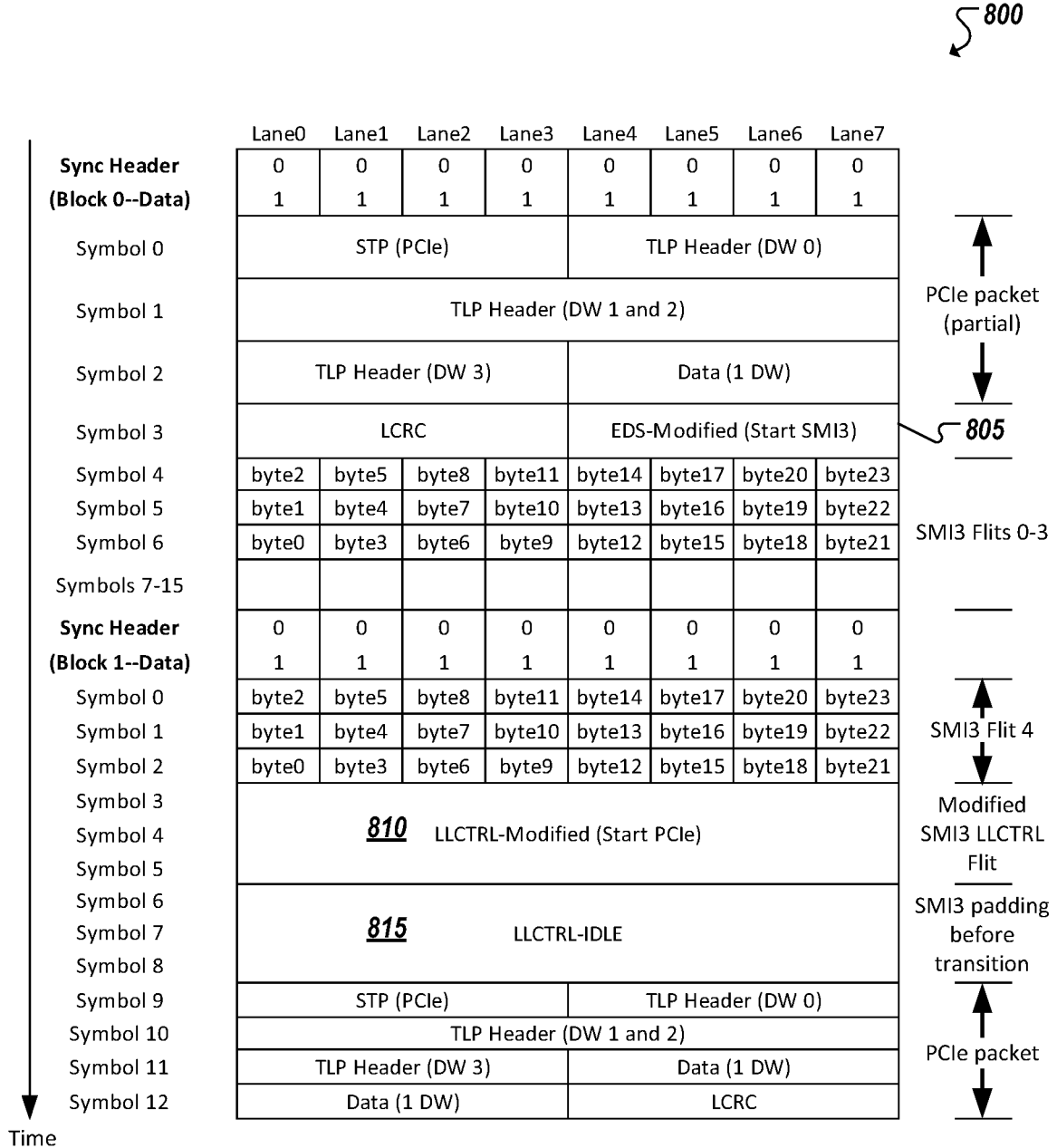
FIG. 8 is a representation of data transmitted according to another example of a shared memory link.

Turning to FIG. 8, a representation 800 of another example implementation of SML is illustrated. In this alternative embodiment, SML can provide for interleaving SMI3 and PCIe protocols through a modified PCIe framing token.

As noted above, an EDS token can be used in PCIe to indicate an end of a data stream and indicate that the next block will be an ordered set block. In the example of FIG. 8, SML can define an SMI3 EDS token (e.g., 805) that indicates the end of a TLP data stream and the transition to SMI3 flit transmissions. An SMI3 EDS (e.g., 805) can be defined by encoding a portion of the reserved bits of the traditional EDS token to indicate that SMI3 data is to follow, rather than PCIe ordered sets or other data that is to follow a PCIe EDS. Unlike the traditional EDS token, the SMI3 EDS can be sent at essentially anywhere within a PCIe data block. This can permit additional flexibility in sending SMI3 data and accommodating corresponding low-latency shared memory transactions. For instance, a transition from PCIe to SMI3 can be accomplished with a single double word (DW) of overhead. Further, as with traditional EDS tokens, an example SMI3 EDS may not specify a length associated with the SMI3 data that is to follow the token. Following an SMI3 EDS, PCIe TLP data can conclude and SMI3 flits proceed on the link. SMI3 traffic can proceed until SMI3 logic passes control back to PCIe logic. In some implementations, the sending of an SMI3 EDS causes control to be passed from PCIe logic to SMI3 logic provided, for instance, on devices connected on the link.

In one example, SMI3 (or another protocol) can define its own link control signaling for use in performing link layer control. For example, in one implementation, SML can define a specialized version of a SMI3 link layer control (LLCTRL) flit (e.g., 810) that indicates a transition from SMI3 back to PCIe protocol. As with an SMI3 EDS, the defined LLCTRL flit (e.g., 810) can cause control to be passed from SMI3 logic back to PCIe logic. In some cases, as shown in the example of FIG. 8, the defined LLCTRL flit (e.g., 810) can be padded with a predefined number of LLCTRL idle (LLCTRL-IDLE) flits (e.g., 815) before completing the transition to PCIe. For instance, the number of LLCTRL-IDLE flits 815 to be sent to pad the SMI3 LLCTRL flit 810 can depend on the latency to decode the defined SMI3 LLCTRL flit 810 signaling the transition. After completing the transition back to PCIe, an STP packet can be sent and TLP packet data can recommence on the link under control of PCIe.

It should be appreciated that the implementations described herein are provided as examples to illustrate certain principles and features disclosed in the Specification. It should be appreciated that alternative configurations, protocols, and architectures (other than those specifically discussed in the examples) can utilize and apply such principles and features. As an example of one alternative, PCIe memory read/write can be used (e.g., instead of SMI3 protocol) that is enhanced with directory information. The directory information can be implemented through reserve bits of the PCIe packet. In another example, CPU nodes can utilize a cache controller (e.g., as an alternative to a shared memory controller) to send memory read/write transactions on a PCIe link, for instance, based on a remote address range check, among other potential examples and alternatives.

Turning to FIGS. 9A-9D, flowcharts 900*a-d* are shown illustrating example techniques for communicating using an MCPL. For instance, in FIG. 9A, a load/store memory access message can be received 905 from a first node, the message requesting particular data of a shared memory. Access to the particular data can be provided 910 to the first node. A second load/store memory access message can be received 915 from a second independent node. The second message can request access to the same particular data of the shared memory and access to the particular data can be provided 920 to the second node. Data in shared memory can thus be shared and accessed by multiple different independent nodes.

In the example of FIG. 9B, a first sync header (such as a PCIe sync header) can be received 925 with a first encoding. The encoding can indicate a transition from an interconnect protocol to a memory access protocol and the transition can be identified 930 from the first sync header. Data of the memory access protocol can be received following the first sync header and the data can be processed 935 (e.g., consistent with the memory access protocol). In some examples, the memory access protocol data can include transactions involving shared memory shared by multiple independent nodes. A second sync header can be received 940 that includes a second, different encoding that indicates a transition from the interconnect protocol. The transition from the memory access protocol back to the interconnect protocol can be identified 945 from the second sync header.

Turning to FIG. 9C, in some instances, a first start of data token (e.g., a PCIe STP token) can be received 950 that includes one or more values encoded to identify a transition from an interconnect protocol to a memory access protocol. Data of the memory access protocol can arrive following the first start of data token and can be identified 955. The data of the memory access protocol can be processed 960. A length field can be included in the first start of data token indicating when data is to transition back to interconnect protocol data. Indeed, in some implementations, the length field of a start of data token can be encoded to indicate a length that corresponds to data of the memory access protocol. Further, a second, different start of data framing token can be defined that is to be interpreted to correspond to arrival of data of the interconnect protocol. Each of the first and second start of data framing tokens can be defined according to the interconnect protocol (e.g., PCIe), among other examples.

In the example of FIG. 9D, an end of stream token (e.g., a specialized PCIe EDS token) can be received 965 that is encoded to indicate a transition to memory access protocol data. The received end of stream token can cause a transition 970 from link layer logic for processing interconnect protocol data to link layer logic for processing memory access protocol data. Data of the memory access protocol can be received 975 and processed using the link layer logic of the memory access protocol. Link layer control data of the memory access protocol can be received 980 (e.g., at the end of the data of the memory access protocol) to indicate a transition to data of the interconnect protocol. Receiving 980 the link layer control data can cause a transition 985 from the link layer logic of the memory access protocol to the link layer logic of the interconnect protocol. Data of the interconnect protocol can be received following the link layer control data and can be processed by the link layer logic of the interconnect protocol following the transition 985, among other examples.

It should be noted that while much of the above principles and examples are described within the context of PCIe and particular revisions of the PCIe specification, the principles, solutions, and features described herein can be equally applicable to other protocols and systems. For instance, analogous lane errors can be detected in other links using other protocols based on analogous symbols, data streams, and tokens, as well as rules specified for the use, placement, and formatting of such structures within data transmitted over these other links. Further, alternative mechanisms and structures (e.g., beside a PCIe LES register or SKP OS) can be used to provide lane error detection and reporting functionality within a system. Moreover, combinations of the above solutions can be applied within systems, including combinations of logical and physical enhancements to a link and its corresponding logic as described herein, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 10:
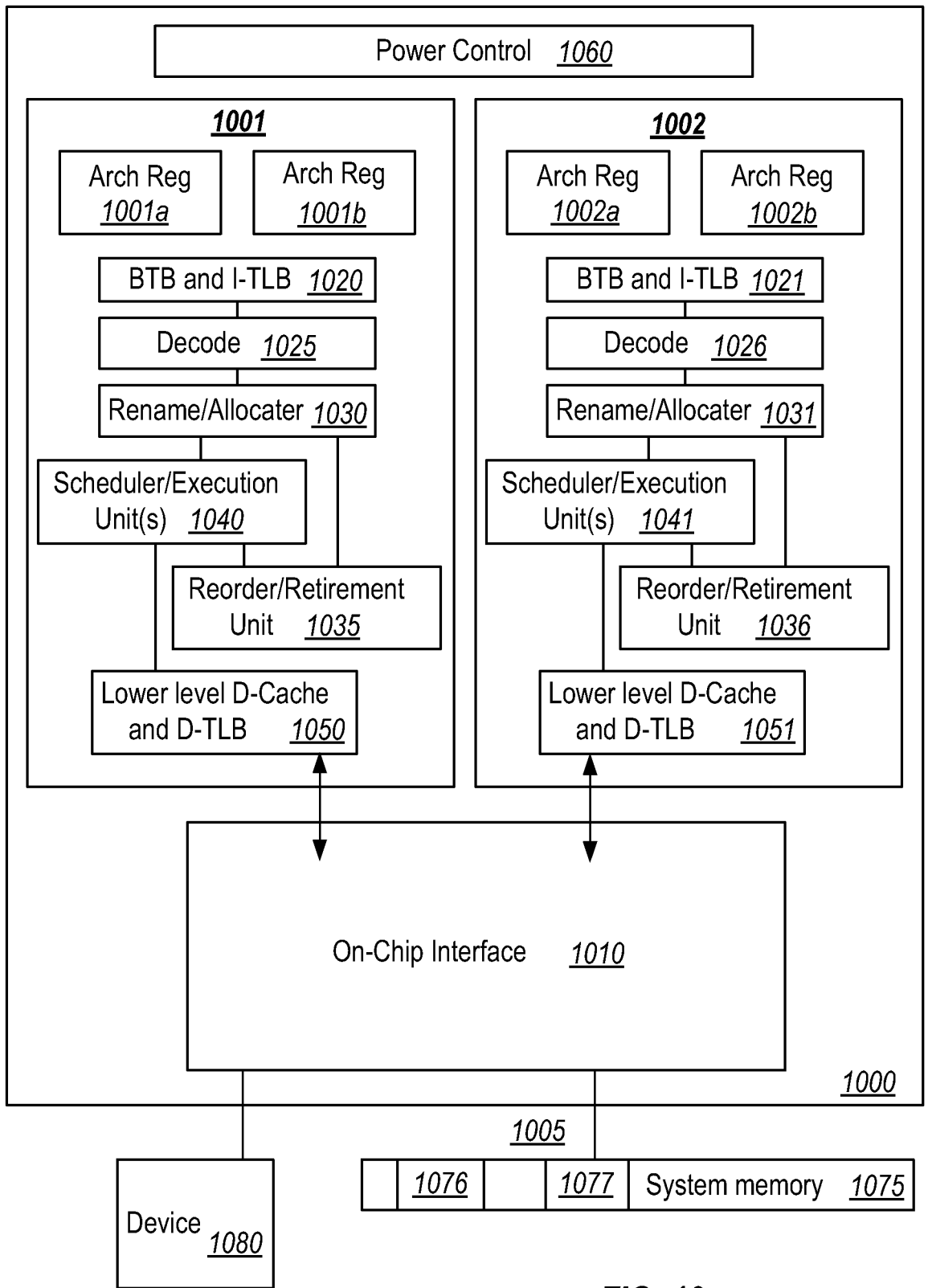
FIG. 10 illustrates an embodiment of a block diagram for a computing system including a multicore processor.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001*a* and 1001*b* are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
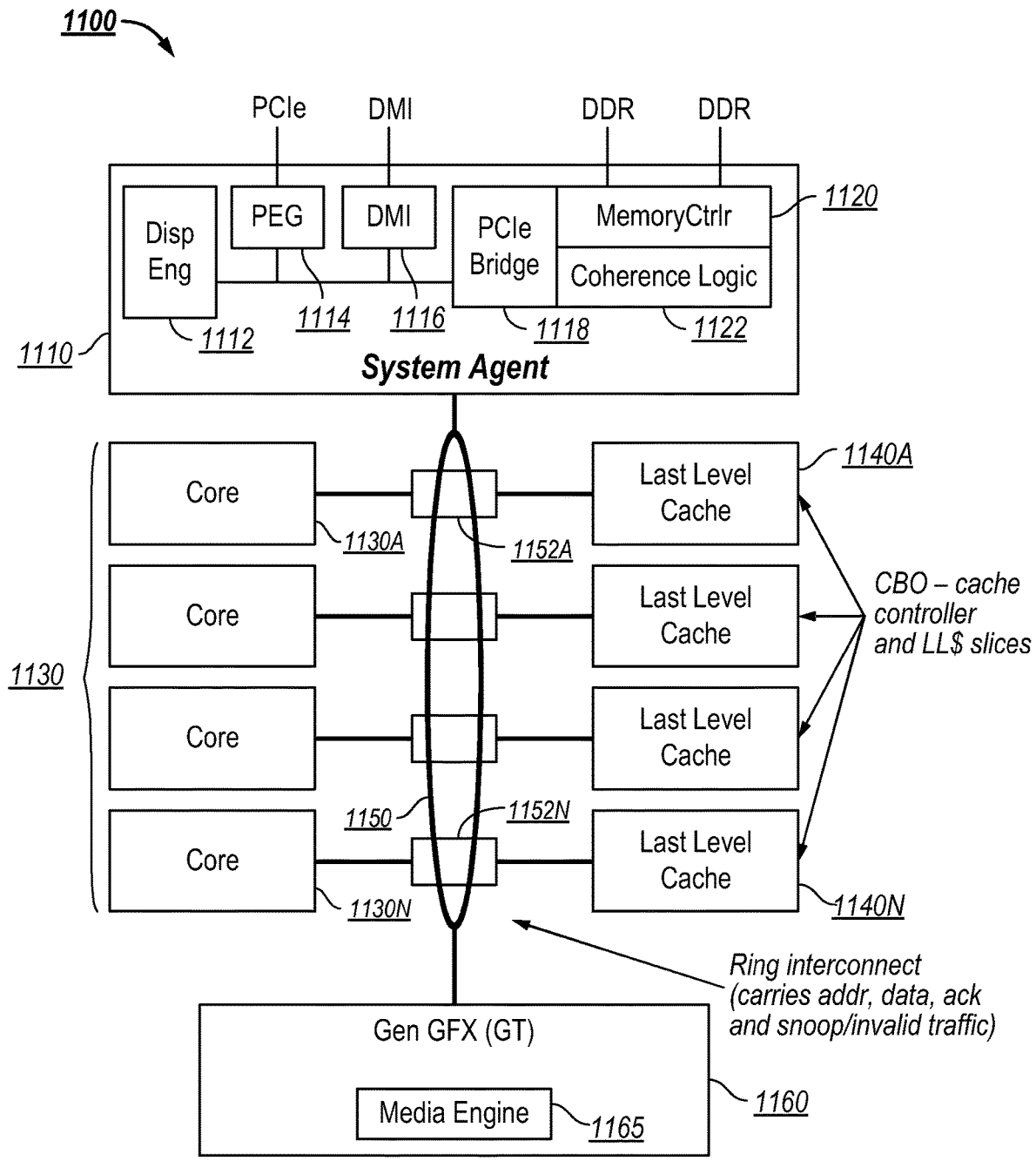
FIG. 11 illustrates another embodiment of a block diagram for a computing system including a multicore processor.

Referring now to FIG. 11, shown is a block diagram of an embodiment of a multicore processor. As shown in the embodiment of FIG. 11, processor 1100 includes multiple domains. Specifically, a core domain 1130 includes a plurality of cores 1130A-1130N, a graphics domain 1160 includes one or more graphics engines having a media engine 1165, and a system agent domain 1110.

In various embodiments, system agent domain 1110 handles power control events and power management, such that individual units of domains 1130 and 1160 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1130 and 1160 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1130 further includes low level caches in addition to various execution units and additional processing elements. Here, the various cores are coupled to each other and to a shared cache memory that is formed of a plurality of units or slices of a last level cache (LLC) 1140A-1140N; these LLCs often include storage and cache controller functionality and are shared amongst the cores, as well as potentially among the graphics engine too.

As seen, a ring interconnect 1150 couples the cores together, and provides interconnection between the core domain 1130, graphics domain 1160 and system agent circuitry 1110, via a plurality of ring stops 1152A-1152N, each at a coupling between a core and LLC slice. As seen in FIG. 11, interconnect 1150 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1110 includes display engine 1112 which is to provide control of and an interface to an associated display. System agent domain 1110 may include other units, such as: an integrated memory controller 1120 that provides for an interface to a system memory (e.g., a DRAM implemented with multiple DIMMs; coherence logic 1122 to perform memory coherence operations. Multiple interfaces may be present to enable interconnection between the processor and other circuitry. For example, in one embodiment at least one direct media interface (DMI) 1116 interface is provided as well as one or more PCIe™ interfaces 1114. The display engine and these interfaces typically couple to memory via a PCIe™ bridge 1118. Still further, to provide for communications between other agents, such as additional processors or other circuitry, one or more other interfaces may be provided.

Figure 12:
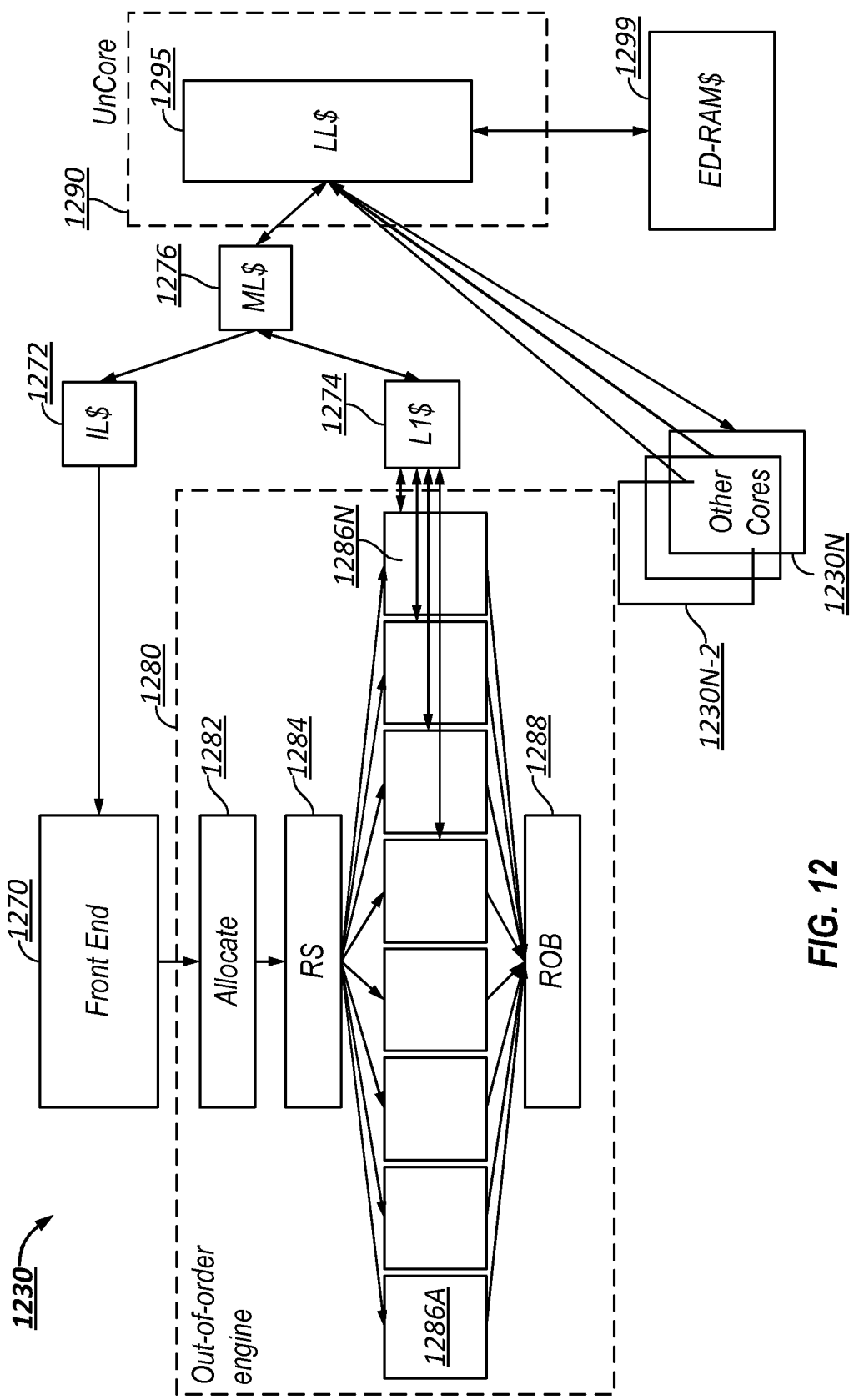
FIG. 12 illustrates an embodiment of a block diagram for a processor.

Referring now to FIG. 12, shown is a block diagram of a representative core; specifically, logical blocks of a back-end of a core, such as core 1130 from FIG. 11. In general, the structure shown in FIG. 12 includes an out-of-order processor that has a front end unit 1270 used to fetch incoming instructions, perform various processing (e.g. caching, decoding, branch predicting, etc.) and passing instructions/operations along to an out-of-order (OOO) engine 1280. OOO engine 1280 performs further processing on decoded instructions.

Specifically in the embodiment of FIG. 12, out-of-order engine 1280 includes an allocate unit 1282 to receive decoded instructions, which may be in the form of one or more micro-instructions or uops, from front end unit 1270, and allocate them to appropriate resources such as registers and so forth. Next, the instructions are provided to a reservation station 1284, which reserves resources and schedules them for execution on one of a plurality of execution units 1286A-1286N. Various types of execution units may be present, including, for example, arithmetic logic units (ALUs), load and store units, vector processing units (VPUs), floating point execution units, among others. Results from these different execution units are provided to a reorder buffer (ROB) 1288, which take unordered results and return them to correct program order.

Still referring to FIG. 12, note that both front end unit 1270 and out-of-order engine 1280 are coupled to different levels of a memory hierarchy. Specifically shown is an instruction level cache 1272, that in turn couples to a mid-level cache 1276, that in turn couples to a last level cache 1295. In one embodiment, last level cache 1295 is implemented in an on-chip (sometimes referred to as uncore) unit 1290. As an example, unit 1290 is similar to system agent 1110 of FIG. 11. As discussed above, uncore 1290 communicates with system memory 1299, which, in the illustrated embodiment, is implemented via ED RAM. Note also that the various execution units 1286 within out-of-order engine 1280 are in communication with a first level cache 1274 that also is in communication with mid-level cache 1276. Note also that additional cores 1230N-2-1230N can couple to LLC 1295. Although shown at this high level in the embodiment of FIG. 12, understand that various alterations and additional components may be present.

Figure 13:
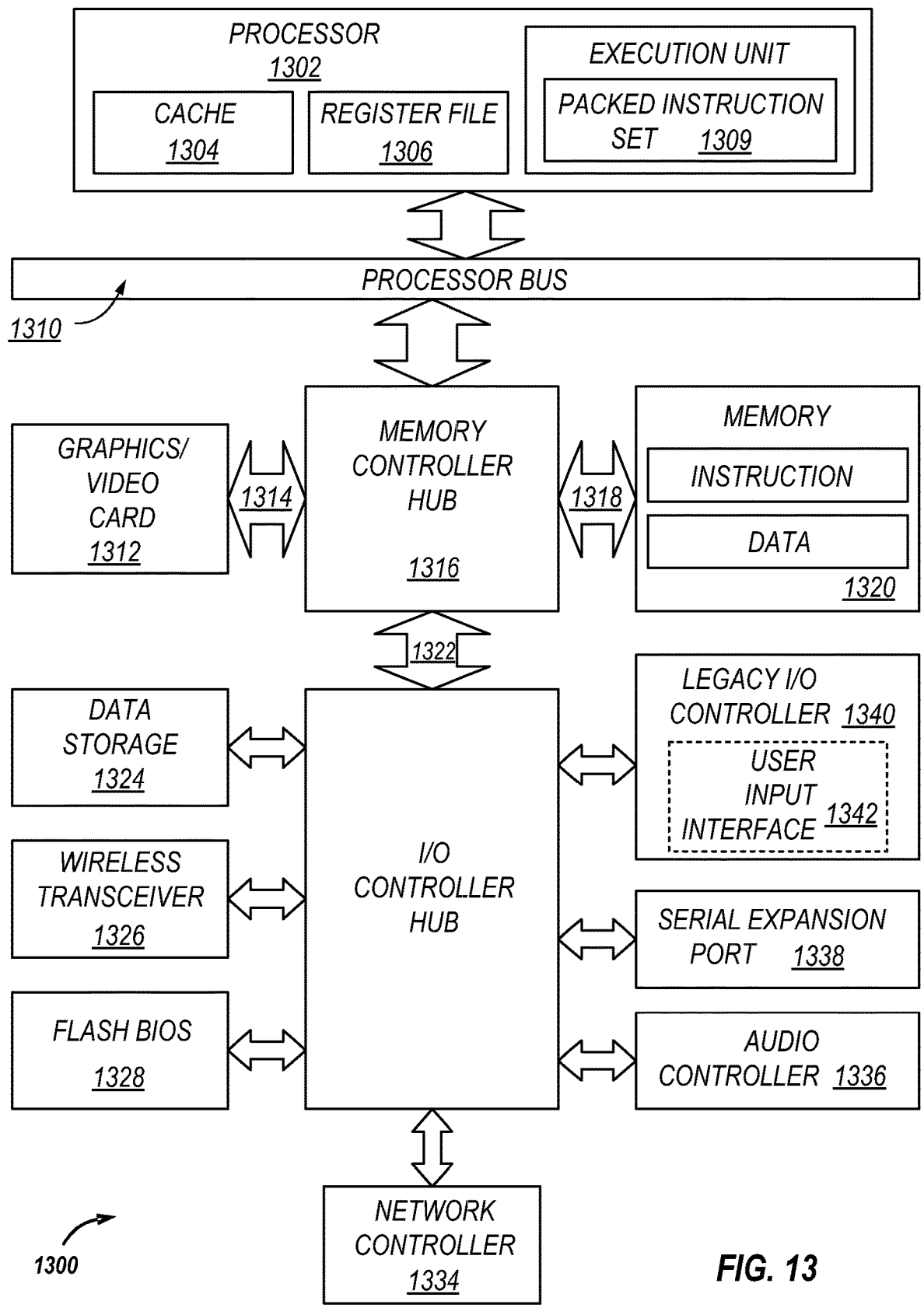
FIG. 13 illustrates another embodiment of a block diagram for a computing system including a processor.

Turning to FIG. 13, a block diagram of an exemplary computer system formed with a processor that includes execution units to execute an instruction, where one or more of the interconnects implement one or more features in accordance with one embodiment of the present invention is illustrated. System 1300 includes a component, such as a processor 1302 to employ execution units including logic to perform algorithms for process data, in accordance with the present invention, such as in the embodiment described herein. System 1300 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1302 includes one or more execution units 1308 to implement an algorithm that is to perform at least one instruction. One embodiment may be described in the context of a single processor desktop or server system, but alternative embodiments may be included in a multiprocessor system. System 1300 is an example of a 'hub' system architecture. The computer system 1300 includes a processor 1302 to process data signals. The processor 1302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1302 is coupled to a processor bus 1310 that transmits data signals between the processor 1302 and other components in the system 1300. The elements of system 1300 (e.g. graphics accelerator 1312, memory controller hub 1316, memory 1320, I/O controller hub 1324, wireless transceiver 1326, Flash BIOS 1328, Network controller 1334, Audio controller 1336, Serial expansion port 1338, I/O controller 1340, etc.) perform their conventional functions that are well known to those familiar with the art.

In one embodiment, the processor 1302 includes a Level 1 (L1) internal cache memory 1304. Depending on the architecture, the processor 1302 may have a single internal cache or multiple levels of internal caches. Other embodiments include a combination of both internal and external caches depending on the particular implementation and needs. Register file 1306 is to store different types of data in various registers including integer registers, floating point registers, vector registers, banked registers, shadow registers, checkpoint registers, status registers, and instruction pointer register.

Execution unit 1308, including logic to perform integer and floating point operations, also resides in the processor 1302. The processor 1302, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1302. For one embodiment, execution unit 1308 includes logic to handle a packed instruction set 1309. By including the packed instruction set 1309 in the instruction set of a general-purpose processor 1302, along with associated circuitry to execute the instructions, the operations used by many multimedia applications may be performed using packed data in a general-purpose processor 1302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1308 may also be used in micro controllers, embedded processors, graphics devices, DSPs, and other types of logic circuits. System 1300 includes a memory 1320. Memory 1320 includes a dynamic random access memory (DRAM) device, a static random access memory (SRAM) device, flash memory device, or other memory device. Memory 1320 stores instructions and/or data represented by data signals that are to be executed by the processor 1302.

Note that any of the aforementioned features or aspects of the invention may be utilized on one or more interconnect illustrated in FIG. 13. For example, an on-die interconnect (ODI), which is not shown, for coupling internal units of processor 1302 implements one or more aspects of the invention described above. Or the invention is associated with a processor bus 1310 (e.g. other known high performance computing interconnect), a high bandwidth memory path 1318 to memory 1320, a point-to-point link to graphics accelerator 1312 (e.g. a Peripheral Component Interconnect express (PCIe) compliant fabric), a controller hub interconnect 1322, an I/O or other interconnect (e.g. USB, PCI, PCIe) for coupling the other illustrated components. Some examples of such components include the audio controller 1336, firmware hub (flash BIOS) 1328, wireless transceiver 1326, data storage 1324, legacy I/O controller 1310 containing user input and keyboard interfaces 1342, a serial expansion port 1338 such as Universal Serial Bus (USB), and a network controller 1334. The data storage device 1324 can comprise a hard disk drive, a floppy disk drive, a CD-ROM device, a flash memory device, or other mass storage device.

Figure 14:
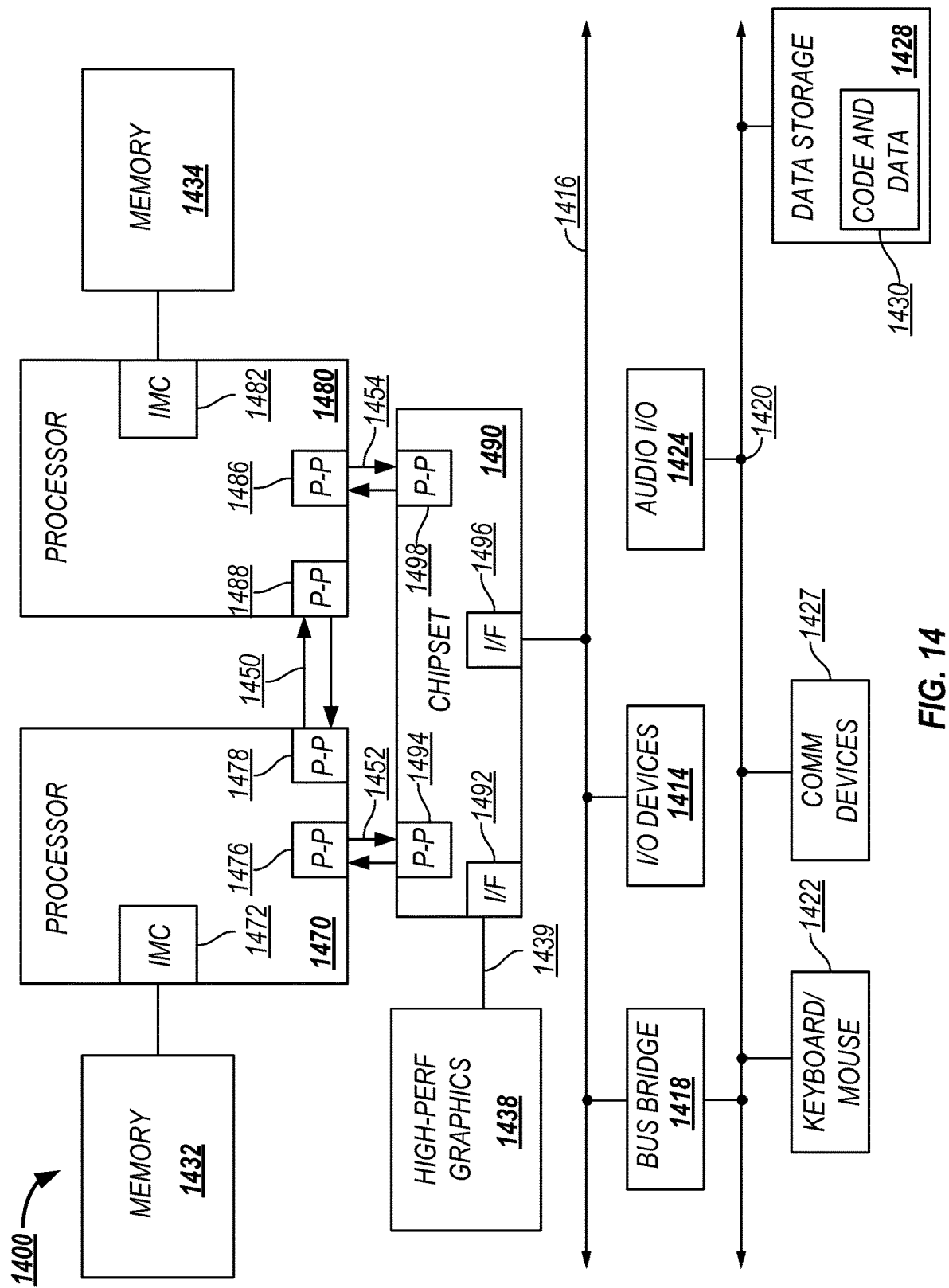
FIG. 14 illustrates an embodiment of a block for a computing system including multiple processors.

Referring now to FIG. 14, shown is a block diagram of a second system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as a high-performance architecture. As a result, the invention may be implemented within the QPI architecture.

While shown with only two processors 1470, 1480, it is to be understood that the scope of the present invention is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

Figure 15:
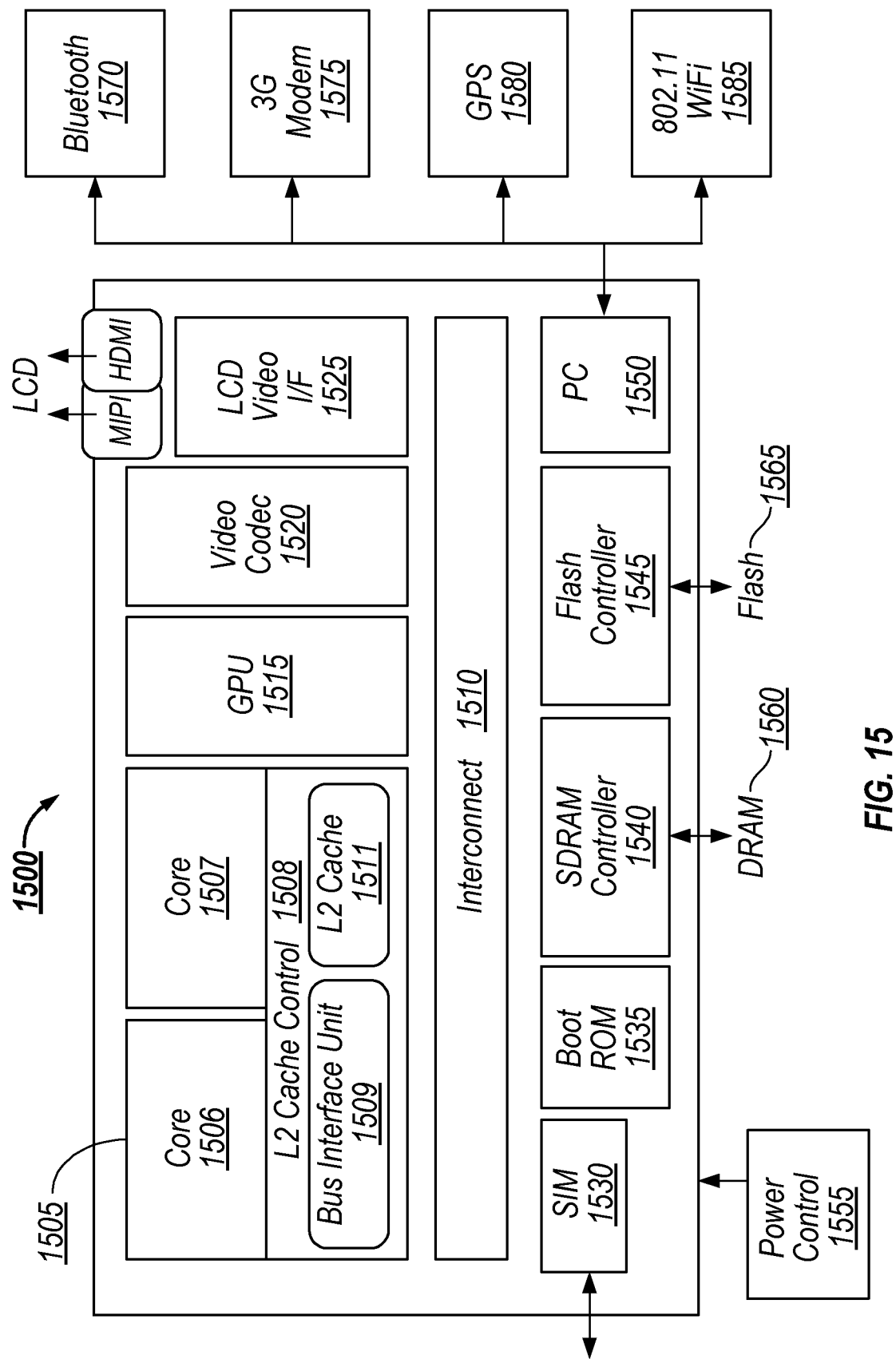
FIG. 15 illustrates an example system implemented as system on chip (SoC).

Turning next to FIG. 15, an embodiment of a system on-chip (SOC) design in accordance with the inventions is depicted. As a specific illustrative example, SOC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1500 includes 2 cores—1506 and 1507. Similar to the discussion above, cores 1506 and 1507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1511 to communicate with other parts of system 1500. Interconnect 1510 includes an on-chip interconnect, such as an IOSF, AMBA, or other interconnect discussed above, which potentially implements one or more aspects of described herein.

Interface 1510 provides communication channels to the other components, such as a Subscriber Identity Module (SIM) 1530 to interface with a SIM card, a boot rom 1535 to hold boot code for execution by cores 1506 and 1507 to initialize and boot SOC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the invention described herein.

In addition, the system illustrates peripherals for communication, such as a Bluetooth module 1570, 3G modem 1575, GPS 1585, and WiFi 1585. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to provide a shared memory controller to service load and store operations from a plurality of independent nodes to provide access to a shared memory resource, wherein each of the plurality of independent nodes is to be permitted to access a respective portion of the shared memory resource.

In at least one example, the load and store operations are communicated using a shared memory link protocol.

In at least one example, the share memory link protocol includes a memory access protocol utilizing physical layer logic of a different interconnect protocol.

In at least one example, the share memory link protocol provides for multiplexing between transmission of data of the memory access protocol data and transmission of data of the interconnect protocol.

In at least one example, the data of the interconnect protocol comprises at least one of link layer data and transaction layer data.

In at least one example, the memory access protocol comprises SMI3 and the interconnect protocol comprises Peripheral Component Interconnect (PCI) Express (PCIe).

In at least one example, transitions between interconnect protocol data and memory access protocol data are identified by a sync header encoded to identify the transitions.

In at least one example, transitions between interconnect protocol data and memory access protocol data are identified by a start of data framing token encoded to identify the transitions.

In at least one example, transitions from interconnect protocol data to memory access protocol data are identified by an end of data stream framing token of the interconnect protocol encoded to identify the transitions, and transitions from memory access protocol data to interconnect protocol data are identified by link layer control flits of the memory access protocol.

In at least one example, the shared memory link protocol is tunneled over a network protocol stack.

In at least one example, the network protocol stack comprises Ethernet.

In at least one example, a first of the plurality of CPU nodes is on a first board and a second of the plurality of CPU nodes is on a second board separate from the first board.

In at least one example, at least two of the plurality of CPU nodes are on the same device.

In at least one example, the shared memory controller is further to track memory transactions involving the load and store operations.

In at least one example, the shared memory controller is further to identify that a particular one of the plurality of CPU node fail, identify a portion of the memory transactions of the particular CPU node, and drop the portion of the memory transactions of the particular CPU node while maintaining all other memory transactions.

In at least one example, the shared memory controller is further to manage access permissions by the plurality of CPU nodes to data in the shared memory resource.

In at least one example, at least a particular one of the plurality of CPU nodes is blocked from accessing at least a first portion of the shared memory and a second one of the plurality of CPU nodes is permitted to access the first portion.

In at least one example, the shared memory controller is further to manage directory information for data in the shared memory resource.

In at least one example, the directory information identifies for each of a plurality of data resources stored in the shared memory resource, whether access to the respective data resource is exclusive to one of the plurality of CPU nodes or shared between two or more of the plurality of CPU nodes.

In at least one example, the shared memory controller is further to negotiate a change of access for a particular one of the plurality of data resources, wherein the change comprises at least one of changing access from shared to exclusive and changing access from exclusive to shared.

In at least one example, the shared memory controller is coupled to at least one other shared memory controller managing at least one other shared memory resource and the shared memory controller is further to communicate load/store operations to the other shared memory controller to permit the plurality of CPU node to access the other shared memory.

In at least one example, the shared memory controller is further to map address information in the load and store operations to corresponding data resources stored in the shared memory resource.

One or more embodiments may provide an apparatus, a system, a machine readable storage, a machine readable medium, hardware- and/or software-based logic, and a method to send a memory access request to a shared memory controller, wherein the memory access request comprises a load/store operation and is to identify an address of a data resource to be included in a shared memory resource corresponding to the shared memory controller, and each of a plurality of independent nodes is to be permitted to access a respective portion of the shared memory resource.

In at least one example, the memory access request comprises a load request and the I/O logic is further to receive data corresponding to the data resource in response to the load request.

In at least one example, the memory access request comprises a store request.

In at least one example, the memory access request is sent using a shared memory link protocol and the share memory link protocol includes a memory access protocol utilizing physical layer logic of a different interconnect protocol.

In at least one example, the share memory link protocol provides for multiplexing between transmission of data of the memory access protocol data and transmission of data of the interconnect protocol.

In at least one example, transitions between interconnect protocol data and memory access protocol data are identified by at least one of: (a) a sync header encoded to identify the transitions; (b) a start of data framing token encoded to identify the transitions; and (c) an end of data stream framing token encoded to identify the transitions.

In at least one example, the memory access protocol comprises SMI3 and the interconnect protocol comprises a PCIe-based protocol.

In at least one example, a particular one of the plurality of nodes comprises multiple CPU sockets and local memory. In at least one example, the shared memory resource is on a device separate from the particular node.

One or more embodiments may provide an apparatus, a system, a machine readable storage, a machine readable medium, hardware- and/or software-based logic, and a method to receive a first load/store message from a first independent CPU node that identifies a particular data in a shared memory, provide access to the particular data to the first CPU node in response to the first load/store message, receive a second load/store message from a second independent CPU node that identifies a particular data in a shared memory, and provide access to the particular data to the second CPU memory in response to the second load/store message.

In at least one example, each of the first and second first load/store messages are received over a data link using a shared memory link protocol.

At least some embodiments can provide for identifying that the first CPU node is permitted to access the particular data and identifying that the second CPU node is permitted to access the particular data.

At least some embodiments can provide for tracking transactions involving the shared memory for each of the first and second CPU nodes.

At least some embodiments can provide for identifying directory information of the particular data, where the directory information identifies whether the particular data is in a shared, uncached, or exclusive state.

In at least one example, the first load/store message identifies the particular data by a first address and the second first load/store message identifies the particular data by a second, different address.

At least some embodiments can provide for mapping the first address to the particular data and mapping the second address to the particular data.

At least some embodiments can provide for a system comprising a first node comprising one or more processor devices, a second node independent from the first node and comprising one or more processor devices, and a shared memory accessible to each of the first and second nodes through a load/store memory access protocol.

In at least one example, the first node has a fault domain independent of the second node.

In at least one example, the first node is controlled by a first operating system and the second node is controlled by a second operating system.

In at least one example, the load/store memory access protocol is included in a shared memory link protocol and the shared memory link protocol toggling between the memory access protocol and a different interconnect protocol.

In at least one example, a shared memory controller can service load and store operations from the first and second nodes and to provide access to the shared memory.

One or more embodiments may provide an apparatus, a system, a machine readable storage, a machine readable medium, hardware- and/or software-based logic, and a method to send a first sync header on lanes of a data link, wherein the first sync header is encoded to identify a transition from data of an interconnect protocol to data of a memory access protocol, and send a second sync header on the lanes of the data link, wherein the second sync header is to be encoded to identify a transition from data of the memory access protocol to data of the interconnect protocol.

In at least one example, each sync header identifies a type of a data block to follow the sync header.

In at least one example, each data block is of a predefined length.

In at least one example, the memory access protocol comprises a protocol based on SMI3.

In at least one example, the interconnect protocol comprises a PCIe-based protocol-based protocol.

In at least one example, each sync header is encoded according to 128b/130b encoding.

In at least one example, the second sync header indicates a data block of the interconnect protocol and a third sync header is to be sent on the lanes of the data link to indicate an ordered set block of the interconnect protocol.

In at least one example, the first sync header is encoded with alternating values on the lanes and the second sync header is encoded with a same value on all of the lanes.

In at least one example, the data of the memory access protocol comprises link layer data and the data of the interconnect protocol comprises one of transaction layer and data link layer packets.

In at least one example, the sync headers are defined according to the interconnect protocol.

In at least one example, the memory access protocol supports load/store memory access messaging.

In at least one example, the memory access protocol data comprises memory access messaging for access to a shared memory resource, wherein each of a plurality of independent nodes is permitted to access a respective portion of the shared memory resource.

In at least one example, each of the plurality of independent nodes has an independent fault domain.

In at least one example, the data link comprises at least four lanes.

One or more embodiments may provide an apparatus, a system, a machine readable storage, a machine readable medium, hardware- and/or software-based logic, and a method to receive a first sync header on lanes of a data link, wherein the first sync header is encoded with a first encoding, identify, from the first encoding of the first sync header, a transition from data of an interconnect protocol to data of a memory access protocol, receive a second sync header on the lanes of the data link, wherein the second sync header is encoded with a second encoding, and identify, from the second encoding of the second sync header, a transition from data of the memory access protocol to data of the interconnect protocol.

In at least one example, each sync header identifies a type of a data block to follow the sync header.

In at least one example, the interconnect protocol comprises a PCIe-based protocol.

In at least one example, the memory access protocol is based on SMI3.

In at least one example, the sync header is encoded according to 128b/130b encoding.

In at least one example, the first encoding comprises values of 01b and 10b alternated on the lanes of the data link.

In at least one example, the data of the memory access protocol comprises load/store memory access messages.

In at least one example, the memory access messages comprise messages to access a shared memory resource, and each of a plurality of independent nodes in a system are permitted to access a respective portion of the shared memory resource.

One or more embodiments may provide an apparatus, a system, a machine readable storage, a machine readable medium, hardware- and/or software-based logic, and a method to receive a first sync header on lanes of a data link, wherein the first sync header is encoded with a first encoding, identify from the first encoding of the first sync header a transition from data of an interconnect protocol to data of a memory access protocol, process the data of the memory access protocol, receive a second sync header on the lanes of the data link, wherein the second sync header is encoded with a second encoding, and identify, from the second encoding of the second sync header, a transition from data of the memory access protocol to data of the interconnect protocol.

In at least one example, the interconnect protocol comprises a PCIe-based protocol and the memory access protocol is based on SMI3.

In at least one example, the sync headers are according to PCIe.

In at least one example, the data of the memory access protocol is processed to service a memory access request included in the data of the memory access protocol.

In at least one example, the memory access request is a request of a shared memory resource shared between a plurality of independent CPU nodes.

In at least one example, the memory access request comprises a load/store message.

One or more embodiments may provide an apparatus, a system, a machine readable storage, a machine readable medium, hardware- and/or software-based logic, and a method to send a first start of data framing token on lanes of a data link, wherein the first start of data framing token is encoded to identify a transition from data of an interconnect protocol to data of a memory access protocol, and send a second start of data framing token on the lanes of the data link, wherein the second start of data framing token is encoded to identify a transition from data of the memory access protocol to data of the interconnect protocol.

In at least one example, the first start of data framing token comprises a modified PCIe STP framing token and the second start of data framing token comprises a PCIe STP framing token.

In at least one example, each start of data framing token includes a length field.

In at least one example, the transition from data of the interconnect protocol to data of the memory access protocol is indicated in the first start of data framing token by a value in the length field of the first start of data framing token.

In at least one example, the data of the memory access protocol is to be sent in a window defined by the length field of the first start of data framing token.

In at least one example, the memory access protocol is based on SMI3.

In at least one example, the interconnect protocol comprises a PCIe-based protocol.

In at least one example, the data of the memory access protocol comprises link layer data and the data of the interconnect protocol comprises one of transaction layer and data link layer packets.

In at least one example, physical layer logic is further to send the data of the memory access protocol and the data of the memory access protocol comprises load/store memory access messages.

In at least one example, the memory access protocol data comprises memory access messages to access a shared memory resource, and each of a plurality of independent nodes is permitted to access a respective portion of the shared memory resource.

In at least one example, each of the plurality of independent nodes has an independent fault domain.

In at least one example, the data link comprises one or more lanes.

One or more embodiments may provide an apparatus, a system, a machine readable storage, a machine readable medium, hardware- and/or software-based logic, and a method to receive a first start of data framing token on lanes of a data link, identify, from the first start of data framing token, arrival of data of a memory access protocol, receive a second start of data framing token on lanes of the data link, wherein the second start of data framing token is different from the first start of data framing token, and identify, from the second start of data framing token, arrival of data of an interconnect protocol.

In at least one example, the first start of data framing token comprises a modified PCIe STP framing token and the second start of data framing token comprises a PCIe STP framing token.

In at least one example, each start of data framing token includes a length field.

In at least one example, the transition from data of the interconnect protocol to data of the memory access protocol is indicated in the first start of data framing token by a value in the length field of the first start of data framing token.

In at least one example, the memory access protocol is based on SMI3 and the interconnect protocol comprises a PCIe-based protocol.

In at least one example, the data of the memory access protocol is received and
the data of the interconnect protocol is received.

One or more embodiments may provide an apparatus, a system, a machine readable storage, a machine readable medium, hardware- and/or software-based logic, and a method to send a first end of data stream framing token on lanes of a data link, wherein the first end of data stream framing token is encoded to identify a transition from an interconnect protocol to a memory access protocol, send memory access protocol data following the transition to the memory access protocol, and send link layer control data of the memory access protocol to identify a transition from the memory access protocol to the interconnect protocol.

In at least one example, the memory access protocol data is to be sent on the data link until the link layer control data is sent.

In at least one example, the transition to the memory access protocol causes a transition from interconnect protocol logic handling data on the data link to memory access protocol logic handling data on the data link.

In at least one example, the memory access protocol comprises a protocol based on SMI3.

In at least one example, the interconnect protocol comprises a PCIe-based protocol.

In at least one example, first end of data stream framing token comprises a modified PCIe EDS framing token.

In at least one example, a PCIe EDS is sent to indicate an end of a set of PCIe transaction layer packets and an arrival of a PCIe ordered set block.

In at least one example, the data of the memory access protocol comprises link layer data and the data of the interconnect protocol comprises one of transaction layer and data link layer packets.

In at least one example, the data of the memory access protocol is sent and comprises load/store memory access messages.

In at least one example, the memory access protocol data comprises memory access messages to access a shared memory resource, and each of a plurality of independent nodes is permitted to access a respective portion of the shared memory resource.

In at least one example, each of the plurality of independent nodes has an independent fault domain.

One or more embodiments may provide an apparatus, a system, a machine readable storage, a machine readable medium, hardware- and/or software-based logic, and a method to receive a first end of data stream framing token on lanes of a data link that is encoded to identify a transition from an interconnect protocol to a memory access protocol, transition to using link layer logic of the memory access protocol based on the first end of data stream framing token, receive memory access protocol link layer data, receive link layer control data of the memory access protocol to identify a transition from the memory access protocol to the interconnect protocol, and transition to using link layer logic of the interconnect protocol based on the link layer control data.

In at least one example, the memory access protocol is based on SMI3.

In at least one example, the interconnect protocol comprises a PCIe-based protocol.

In at least one example, the first end of data stream framing token comprises a modified PCIe EDS framing token.

In at least one example, the data of the memory access protocol comprises link layer data and the data of the interconnect protocol comprises one of transaction layer and data link layer packets.

In at least one example, the data of the memory access protocol comprises load/store memory access messages.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a shared memory controller configured to:
service load and store operations received, over data links, from a plurality of independent nodes to provide access to a shared memory resource, wherein each of the plurality of independent nodes is to be permitted to access a respective portion of the shared memory resource; and
I/O logic configured to:
establish at least a particular one of the data links, wherein the particular data link is established through training of a set of lanes according to a particular interconnect protocol and bringing the particular data link to an active state; and
identify transitions between data of the interconnect protocol and data of a memory access protocol sent on the set of lanes of the particular data link while the particular data link continues in the active state,
wherein the load and store operations are to be communicated using the memory access protocol, the particular interconnect protocol comprises a first multilayer protocol, the memory access protocol comprises a different, second multilayer protocol, the memory access protocol utilizes a physical layer of the particular interconnect protocol, data sequences are sent while in the active state to indicate multiplexing between transmission of payload data of the memory access protocol and transmission of payload data of the particular interconnect protocol, and the transitions between the interconnect protocol data and memory access protocol data correspond to the data sequences and comprise transitions between the payload data of the memory access protocol data and the payload data of the particular interconnect protocol, wherein the data sequences are to precede transmission of a corresponding one of the payload data of the memory access protocol data or the payload data of the particular interconnect protocol.

2. The apparatus of claim 1, wherein multiplexing between transmission of payload data of the memory access protocol and transmission of payload data of the particular interconnect protocol is according to a shared memory link protocol, and the shared memory link protocol is tunneled over a network protocol stack.

3. The apparatus of claim 2, wherein the network protocol stack comprises Ethernet.

4. The apparatus of claim 1, wherein the first multilayer protocol comprises the physical layer, a link layer, and a transaction layer, and the payload data of the particular interconnect protocol comprises at least one of link layer data or transaction layer data.

5. The apparatus of claim 1, wherein the memory access protocol comprises a SM13-based protocol and the particular interconnect protocol comprises a Peripheral Component Interconnect (PCI) Express (PCIe)-based protocol.

6. The apparatus of claim 1, wherein the data sequence comprises a code with a value to identify whether subsequent payload data sent during the active state is payload data of the particular interconnect protocol or payload data of the memory access protocol.

7. The apparatus of claim 1, wherein the data sequence comprises a start of data framing token encoded to identify the transitions.

8. The apparatus of claim 1, wherein transitions from interconnect protocol data to memory access protocol data are identified by an end of data stream framing token of the particular interconnect protocol encoded to identify the transitions, and transitions from data of the memory access protocol to data of the particular interconnect protocol are identified by link layer control flits of the memory access protocol.

9. The apparatus of claim 1, wherein the shared memory controller is further configured to track memory transactions involving the load and store operations.

10. The apparatus of claim 9, wherein the shared memory controller is further configured to:
identify that a particular one of the plurality of nodes fails;
identify a portion of the memory transactions of the particular node; and
drop the portion of the memory transactions of the particular node while maintaining all other memory transactions.

11. The apparatus of claim 1, wherein the shared memory controller is further configured to manage access permissions by the plurality of nodes to data in the shared memory resource.

12. The apparatus of claim 11, wherein at least a particular one of the plurality of nodes is blocked from accessing at least a first portion of the shared memory and a second one of the plurality of nodes is permitted to access the first portion.

13. The apparatus of claim 1, wherein the shared memory controller is further configured to manage directory information for data in the shared memory resource.

14. The apparatus of claim 13, wherein the directory information identifies for each of a plurality of data resources stored in the shared memory resource, whether access to the respective data resource is exclusive to one of the plurality of nodes or shared between two or more of the plurality of nodes.

15. The apparatus of claim 14, wherein the shared memory controller is further configured to negotiate a change of access for a particular one of the plurality of data resources, wherein the change comprises at least one of changing access from shared to exclusive and changing access from exclusive to shared.

16. The apparatus of claim 1, wherein the shared memory controller is coupled to at least one other shared memory controller managing at least one other shared memory resource and the shared memory controller is further configured to communicate load/store operations to the other shared memory controller to permit at least a portion of the plurality of nodes to access the other shared memory.

17. The apparatus of claim 1, wherein the shared memory controller is further configured to map address information in the load and store operations to corresponding data resources stored in the shared memory resource.

18. An apparatus comprising:
I/O logic implemented at least in part in hardware, wherein the I/O logic is configured to:
establish a data link to couple to a shared memory controller, wherein the data link is established through training of a set of physical lanes according to a particular interconnect protocol and bringing the particular data link to an active state, wherein the set of lanes physically couple the apparatus to the shared memory controller, and the data link supports multiplexing between transmission of payload data of a plurality of different interconnect protocols during the active state; and generate a memory access request, wherein the memory access request comprises a load/store operation and is to identify an address of a data resource to be included in a shared memory resource corresponding to a shared memory controller, and each of a plurality of independent nodes is to be permitted to access a respective portion of the shared memory resource; and a transmitter configured to:
send a first indication, while in the active state, that payload data of a particular interconnect protocol is to be sent;
send the first payload data of the particular interconnect protocol during the active state;
send a second indication, following the first payload data and during the active state, that payload data of a memory access protocol is to be sent, wherein the memory access protocol utilizes a physical layer of the particular interconnect protocol, and the memory access protocol comprises upper protocol layers different from upper protocol layers of the particular interconnect protocol; and
send the memory access request to the shared memory controller during the active state, wherein at least a portion of the memory access request is sent in the payload data of the memory access protocol associated with the second indication.

19. The apparatus of claim 18, wherein the memory access request comprises a load request and the I/O logic is further to receive data corresponding to the data resource in response to the load request.

20. The apparatus of claim 18, wherein the memory access request comprises a store request.

21. The apparatus of claim 20, wherein transitions between interconnect protocol data and memory access protocol data are identified by the first or second indication is included in at least one of:

(a) a sync header encoded to identify the transitions;
(b) a start of data framing token encoded to identify the transitions; or
(c) an end of data stream framing token encoded to identify the transitions.

22. The apparatus of claim 18, wherein the upper protocol layers comprise one or more of a link layer and a transaction layer.

23. The apparatus of claim 22, wherein payload data of the particular interconnect protocol comprises one of link layer data and transaction layer data.

24. A system comprising:
a first node comprising one or more processor devices;
a second node, independent from the first node, wherein the second node comprises one or more processor devices; and
a shared memory; and
a memory controller configured to control access to the shared memory, wherein the memory controller is coupled to the first node by a first set of lanes, the memory controller is coupled to a second node by a second set of lanes, and the memory controller comprises I/O circuitry configured to:
train the first set of lanes according to a particular interconnect protocol to establish a first link and bring the first link into an active link state;
receive a request according to a load/store memory access protocol, wherein the link toggles while in the active link state between the memory access protocol to carry payload data of the memory access protocol and the particular interconnect protocol to carry payload data of the particular interconnect protocol, and the memory access protocol utilizes a logical physical layer of the particular interconnect protocol and comprises upper protocol layers different from upper protocol layers of the particular interconnect protocol.

25. The system of claim 24, wherein the upper protocol layers comprise one or more of a link layer and a transaction layer.

* * * * *